(12) United States Patent
Cuttner et al.

(10) Patent No.: US 9,477,666 B2
(45) Date of Patent: Oct. 25, 2016

(54) METHOD AND SYSTEM FOR PROVIDING "WHAT'S NEXT" DATA

(75) Inventors: Craig D. Cuttner, Norwalk, CT (US); Jeffrey A Dibartolomeo, Merrick, NY (US); Bruce Probst, Croton-on-Hudson, NY (US); John Clayton Beyler, Chappaqua, NY (US); Lars Stalling, Barcelona (ES); Juho Parviainen, London (GB); Alexander Thompson Grishaver, Daly City, CA (US); Michael Gabriel, Old Greenwich, CT (US)

(73) Assignee: HOME BOX OFFICE, Inc., New York, NY (US)

( * ) Notice: Subject to any disclaimer, the term of this patent is extended or adjusted under 35 U.S.C. 154(b) by 1751 days.

(21) Appl. No.: 12/449,273

(22) PCT Filed: Jan. 29, 2008

(86) PCT No.: PCT/US2008/001251
§ 371 (c)(1),
(2), (4) Date: Jul. 29, 2009

(87) PCT Pub. No.: WO2088/094616
PCT Pub. Date: Aug. 7, 2008

(65) Prior Publication Data
US 2010/0094866 A1    Apr. 15, 2010

Related U.S. Application Data

(60) Provisional application No. 60/898,369, filed on Jan. 29, 2007.

(51) Int. Cl.
G06F 17/30    (2006.01)
H04N 7/16    (2011.01)
(Continued)

(52) U.S. Cl.
CPC ... G06F 17/30035 (2013.01); G06F 17/30817 (2013.01); G06F 17/30828 (2013.01);
(Continued)

(58) Field of Classification Search
None
See application file for complete search history.

(56) References Cited

U.S. PATENT DOCUMENTS

| 5,790,935 | A |   | 8/1998 | Payton |
| 6,075,526 | A | * | 6/2000 | Rothmuller ............ H04N 5/445 348/E5.099 |

(Continued)

FOREIGN PATENT DOCUMENTS

| EP | 1 193 976 | 4/2002 |
| WO | WO 01/15449 | 3/2001 |

(Continued)

OTHER PUBLICATIONS

International Search Report dated Jun. 18, 2008 issued in corresponding PCT Application No. PCT/US2008/001251.

(Continued)

*Primary Examiner* — Shyue Jiunn Hwa
(74) *Attorney, Agent, or Firm* — Kenyon & Kenyon LLP

(57) ABSTRACT

A system and method for generating a list of content is disclosed. A processor may store in memory at least one content preference of a user, may store at least one non-user content preference of at least one entity other than the user, may associate the at least one non-user content preference with the user, and may generate the content list based on a combination of the at least one content preference of the user and the at least one non-user content preference for output to the user.

3 Claims, 18 Drawing Sheets

(51) Int. Cl.
*H04N 21/25* (2011.01)
*H04N 21/442* (2011.01)
*H04N 21/45* (2011.01)
*H04N 21/482* (2011.01)

(52) U.S. Cl.
CPC ........ *G06F17/30867* (2013.01); *H04N 7/163* (2013.01); *H04N 21/252* (2013.01); *H04N 21/44222* (2013.01); *H04N 21/4532* (2013.01); *H04N 21/4826* (2013.01)

(56) References Cited

U.S. PATENT DOCUMENTS

| | | | |
|---|---|---|---|
| 6,308,175 B1 * | 10/2001 | Lang | G06F 17/30702 707/608 |
| 6,601,237 B1 | 7/2003 | Ten Kate et al. | |
| 6,618,546 B2 | 9/2003 | Ichioka et al. | |
| 6,636,836 B1 | 10/2003 | Pyo | |
| 6,993,782 B1 | 1/2006 | Newberry et al. | |
| 2001/0011264 A1 * | 8/2001 | Kawasaki | G06F 17/30867 |
| 2002/0059581 A1 | 5/2002 | Billock et al. | |
| 2002/0194585 A1 | 12/2002 | Connelly | |
| 2003/0021232 A1 | 1/2003 | Duplaix et al. | |
| 2003/0126600 A1 | 7/2003 | Heuvelman | |
| 2004/0088235 A1 | 5/2004 | Ziekle et al. | |
| 2004/0221308 A1 | 11/2004 | Cuttner et al. | |
| 2005/0022229 A1 | 1/2005 | Gabriel et al. | |
| 2005/0071323 A1 | 3/2005 | Gabriel et al. | |
| 2007/0053513 A1 * | 3/2007 | Hoffberg | G06K 9/00369 380/201 |
| 2008/0126303 A1 * | 5/2008 | Park | G06F 17/30828 |

FOREIGN PATENT DOCUMENTS

| | | |
|---|---|---|
| WO | WO 03/098932 | 11/2003 |
| WO | WO 2004/064296 | 7/2004 |
| WO | WO 2005/064941 | 7/2005 |
| WO | WO 2007/010443 | 1/2007 |

OTHER PUBLICATIONS

CBS News Video—Top Stories and Video News Clips at CBSNews.com, Retrieved from the Internet: <URL: http://www.cbsnews.com> on Aug. 8, 2007.

European Search Report dated Feb. 29, 2012 issued in corresponding European Patent Application No. 08 713 351.8.

* cited by examiner

| |
|---|
| PROGRAM_ID |
| PROGRAM_NAME |
| CATEGORY |
| CLASSIFICATION |
| DESCRIPTION |
| STILL_IMAGE |
| PREVIEW_VIDEO |
| PREVIEW_AUDIO |
| FULL_VIDEO |
| FULL_AUDIO |

Fig. 4

| STATION_ID |
|---|
| VIEWER_ID |
| CLASSIFICATION |

| EPG DATA | CHANNEL | METADATA | TIME | BAND WIDTH |
|---|---|---|---|---|
| | HBO 501 | HARRY | | SUBSCRIBE? |
| | HBO 502 | POTTER | | COST |
| | | MOVIE | CURRENT | |
| | | ACTORS | | |
| | | GENRE | | BANDWIDTH |
| | | EPISODE | /FUTURE | COST |
| | | ID | | TIME |

| TOC (NETWORK) | ASSET | METADATA | AVAIL | BAND WIDTH |
|---|---|---|---|---|
| | SOPRANOS 1 | SERIES | Y/N | SUBSCRIBE? |
| | SOPRANOS 2 | ACTOR | | COST? |
| | | GENRE | | TIME TO |
| | | EPISODE | | DELIVER |
| | | ID | | |

| TOC (LOCAL) | ASSET | METADATA | AVAIL | ATTRIBUTES |
|---|---|---|---|---|
| | SIX FEET 1 | SERIES | Y | COPY PROTECTION/EXPIRE |
| | SIX FEET 2 | SERIES | | EXPIRE DATE |
| | | EPISODE | | |
| | | ID | | |

| EXTENDED METADATA | TAG | METADATA VALUE (XML) |
|---|---|---|
| | EPISODE ID | ACTOR-JOHN SMITH, METHOD ACTOR, GENRE=VIOLENCE=3.7; ACTION=4.2; ROMANCE=8 PREFERENCE=FEMALE=8.7; GAY=4.1; ANIME=0 (EDITORIAL) |

| FUTURE | ASSET | COST TO OBTAIN | LOCATION |
|---|---|---|---|
| | SOPRANOS SEASON | | |

METHOD AND SYSTEM FOR PROVIDING "WHAT'S NEXT" DATA

CROSS-REFERENCE TO RELATED APPLICATIONS

The present application is a national stage application of International Patent Application No. PCT/US2008/001251, filed Jan. 29, 2008, which claims priority to U.S. Provisional Patent Application Ser. No. 60/898,369, filed Jan. 29, 2007, the entirety of which is incorporated herein by reference thereto.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for providing interactive, dynamically-created personalized lists of available media content that can be selected and viewed.

BACKGROUND INFORMATION

Television and other media content providers provide information displays through which a user must navigate until the user finds a program of interest. Sometimes, a user must navigate through descriptions of hundreds of programs presented on various channels until the user finds the program of interest. Further, amongst the program descriptions dismissed by the user as uninteresting to the user, there are often programs which would be of interest, but the descriptions of which to include information indicating the programs to be ones of interest.

Accordingly, there is a need for a method and system for presenting user-tailored lists of programs so that a user may navigate fewer than the number of available programs that would otherwise be provided for navigation, and so that the user does not immediately dismiss as uninteresting programs in which the user would likely have an interest.

SUMMARY

In an example embodiment of the present invention, three search engines may operate independently and in parallel to dynamically create media content recommendations, referred to herein as "What's next" data/content. The "What's next" data/content may be a list of selectable media content based in varying degree on what the user is watching, what others are watching, and what the content provider or distributor wants to show.

The search engines may utilize multiple sources of recommendations. A non-exhaustive list of exemplary sources may include usage patterns, content provider to showcases, temporal availability, talent, friends, award winning content, mood of the user. The combined output of the engines may take the multiple sources and provide the resulting recommendations to the user based on which content sources the user would prefer to utilize.

The real-time dynamic creation of content lists may be based in large part on current viewing patterns and not solely on what users indicate their interests are.

A first search engine according to the invention, which may be referred to as a Preference Engine, may perform searches based on the user's past and current content selections and patterns of viewing.

A second search engine, which may be referred to as a Recommendation Engine, may perform searches based on past and current selections by a community of users determined to be related in a predetermined way to the user in some way, e.g., based on by geographical location or other demographic, or based on user profiles of the community of users.

A third engine, which may be referred to as a Curatorial Engine, may perform searches based on the preferences of a selected reference, which may be a celebrity/media personality or demographic, e.g., other than the community of users related to the user. Such preferences may be specified, e.g., in a user profile of the personality or demographic or may be observed based on selections of the personality or demographic. This engine may use information available about the preferences of that celebrity or demographic. Alternatively, or by default, the third search engine may provide a list of content currently being promoted by a content provider/distributor. It will be appreciated that a different number of search engines may be used in other embodiments of the present invention. For example, the Curatorial Engine may perform searches based on a celebrity and a fourth engine may provide a list of promoted content. The preferences of the different entities may be received, for example, by downloading over a network, by receiving a transmission from a content provider, or may be otherwise input, e.g., manually or by insertion of a storage medium.

The three search engines may capture all channels/sources to create a single source of preferred content for a user.

The output of the three engines may be used to create a modified user preference profile, which may be stored at a home unit or at another location. The user profile created may depend on the dynamics between the three engines, which can be tailored to weight the output from each. The weightings may be set by the user, the content provider/distributor, or combinations thereof. In an embodiment of the present invention, the user can select and dynamically configure the output from the three search engines based on the user's interests at any particular moment. According to this embodiment, original user preferences, e.g., of the user-entered user profile and or observed-user-history based preference profile may be maintained. The user may provide input instructing the use of only the original user preferences, or assign different weights to the original user profile and the preferences used by other engines. If weights assigned to the different engines change or if the preferences of the different engines change, the changes may be applied to modify the original user preferences to generate a new modified user preference profile. In alternative embodiment, a user preference profile may be independent of the output of the engines. Different lists of content may be generated based on different ones of the user preference profile, and the engines. The lists may be combined to generate a final list for display.

A single search engine may perform the operations of the above-mentioned search engines. However, the three search engines may operate in parallel to provide more efficient and quicker displays of lists customized to a particular user than, for example, a single search engine performing the equivalent types of searches. The system and method of the present invention may reference and weight the output of more than one engine and may be media independent so that the "What's next" data/content, including data based on output of the three search engines, may include programs of different sources.

The system may, for example, compile reviews from multiple critics for the same content. The user may configure the system to give different weightings to the opinions of different critics.

A content provider/distributor may provide to a user a representation of the three search engines in a user interface via which the user may alter characteristics of the engines, e.g., weightings to be applied by the engines or weightings of the engines' output relative to each other. As the user configures the output of the engines, a log may record the user's selections and preferences, which may then be applied against a database for comparing similar consumer behavior and generating recommendations based on that backend database. For example, if the user sets a weighting of the curatorial engine high relative to the other engines, the system may recommend a program that is popular with other users that similarly set the weighting of the curatorial engine high relative to the other engines. That is, the search engines may provide different output for different weightings being applied to the search engines. Alternatively, the matching of weightings to may be the operation of another search engine.

As the engines' weightings are changed, the system and method of the present invention may dynamically reconfigure a screen (interface) in real time in accordance with results that are produced by the interplay of the curatorial, recommendation, and preference engines and that change in response to the change in the weights. The content may be transmitted or provided to users by any means. For example, the content may be transmitted to the users via a cable television network, a satellite network, a video-on-demand (VOD) network, a pay-per-view (PPV) network, and a web-based network, broadcast, multicast, and point cast. The content may also be provided to users on removable media such as CDs, DVDs, tapes, EEPROM, etc.

Viewing platforms may include, for example, broadcast television, cable television, satellite television, VOD, PPV, Web-based video and/or audio streaming or download sites, etc.

The content displayed in the dynamically created lists may be information about programs that are stored locally or remotely (relative to the user), programs that are currently airing on television, programs that are scheduled to air on television, and/or programs that are available via download, streaming, etc.

As a program comes to an end, a number of options for what to watch next may be presented to a user. These options may be the next several items in a standard channel-playlist, the next several items in a channel-playlist modified based on determined recommended programs, or a combination of the next several recommended items of multiple channels. User targeted options may be provided, for example, during the ending credits of shows. The particular options provided during the ending credits of a particular show may be, e.g., partly, based on the particular show with which the ending credits are associated. For example, selections by other users who have watched the particular show and/or who have similar profiles to that of the user may be taken into consideration for determining which options to provide to the user.

In one embodiment, "What's next" data/content may be locally overlaid on a program feed. For example, the "What's next" data/content may be provided in an empty space between lines of ending credits, or the ending credits may be displayed in one window of the screen, while the "What's next" data/content is displayed in another window of the screen. Examples of how the "What's next" data/content may be displayed include display as pop-ups or as a ticker. Users may navigate and select these "What's next" options using, for example, a handheld remote control.

BRIEF DESCRIPTION OF THE DRAWINGS

FIGS. 4 and 5 are tables containing lists of data items that may be stored in the mass storage system shown in FIG. 3, according to an example embodiment of the present invention.

FIG. 9 illustrates an exemplary Account Manager Screen.

FIG. 10 illustrates data types that may be used by the system illustrated in FIG. 8.

DETAILED DESCRIPTION OF EXAMPLE EMBODIMENTS

Figure 1:
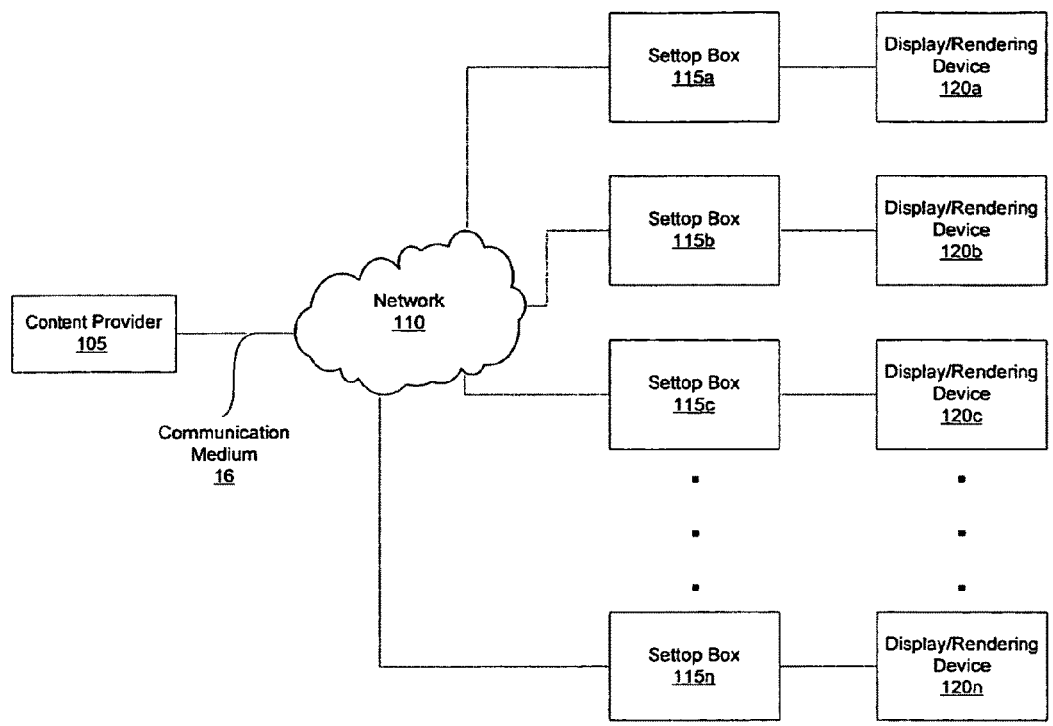
FIG. 1 is a block diagram illustrating components of an example system for which a user customized "What's next" data/content may be displayed, according to an example embodiment of the present invention.

FIG. 1 shows an example system in accordance with an embodiment of the present invention. In this example, a content provider 105 is connected to settop boxes 115*a*-115*n* via a network 110. The content provider 105 may include, for example, a television station, an Internet provider, a cable broadcast system, a satellite broadcast system. The network 110 may be a wired or wireless network, and may include a cable television network, satellite television network, a VOD network, a PPV network, and/or a Web-based network. Alternatively, the content provider 105 may provide broadcast, multicast or Pointcast programming which a user can receive via an antenna. The settop boxes 115a-115n may be coupled to display/rendering devices 120a-120n such as televisions. The display/rendering devices 120a-120n may include conventional television monitors or other suitable video displays. In this embodiment, an Account Manager system and Profile Checking system may reside in a settop box. The settop box may include, for example, a processor and storage devices such as those described below in connection with FIG. 2. The content provider 105 may provide content to each user via the set top boxes 115a-115n.

Figure 2:
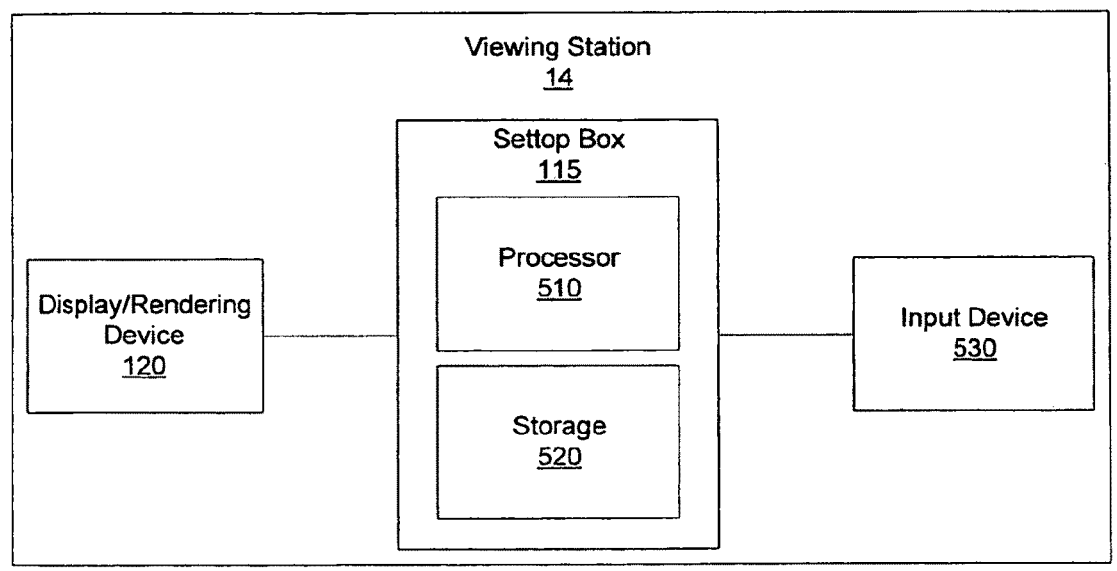
FIG. 2 is a block diagram illustrating components of an example viewing station, according to an example embodiment of the present invention.

FIG. 2 shows an example player mechanism or viewing station 14 in accordance with an example embodiment of the present invention. A viewing station 14 may be located in a user's home or at another location that is convenient for viewing video programs. The viewing station 14 may include, e.g., a settop box 115 or another device that functions as a settop box. For example, a laptop computer may include functionality of the set top box 115. In the embodiment shown in FIG. 2, the settop box 115 includes a processor 510 which, for example, may execute an Account Manager system and a Profile Checking system. A storage medium 520 (e.g., an internal hard disk or other non-volatile memory) may locally store, for example, Account Manager information including system software, system settings, a default profile and user profiles. (In another embodiment, some or all of this information may be stored remotely). Content associated therewith may be stored on storage medium 520, or may be stored on an additional storage medium. The additional storage medium may be a removable medium such as a CD, DVD, flash memory (e.g., a memory stick), magnetic tape, etc. Alternatively, the medium may be a fixed medium such as an internal hard disk. A pointer to metadata associated with the content and/or the metadata itself may be available.

In accordance with an example embodiment of the present invention, metadata is associated with content to describe the subject matter of the content, or describe information associated with the content. For example, each program may have a metadata file associated therewith (Program Metadata File, PMF), which contains information about the program. The PMF may be in an Extensible Markup Language (XML) format to allow for easy expansion for evolving control criteria, but other formats are possible. A non-exhaustive list of examples of types of information that may be stored in the PMF may include:
  MPAA Rating—G, PG, PG-13, R, X, NR, etc.;
  content advisory—explicit sexual scenes, violence, nudity, strong language, drug use, non-heterosexual encounters, etc.;
  actors—a list of key actors;
  director—the program's director;
  synopsis—a description of the plot, etc.; and
  any other relevant information regarding the content (program).

The metadata for each program or content may be associated with the content in a number of different ways. The metadata may be associated with the content by providing a pointer to an XML file. The pointer may be, for example, an address, a file name or location, a URL, or an ID. In an embodiment in which the pointer is a URL, a content provider or a viewing station may retrieve the metadata over the Internet using the URL. The pointer may be embedded in the content, or may be provided separately from the content (e.g., in a table or separate file). The metadata may be stored in file having a predetermined name, or may be stored at a predetermined location or address. In one embodiment, the pointer or the metadata itself is encoded in the Vertical Blanking Interval (VBI) of a television signal carrying the content. In another embodiment, the pointer or the metadata itself is appended, prepended or inserted into the content. In yet another embodiment, the content is provided on a removable medium (e.g., CD, DVD, flash memory, floppy disk, magnetic tape, etc.) and the pointer is also stored on the medium, e.g., in a particular track, at a predetermined address, or at a predetermined location.

In connection with Web-based content, a PMF associated with the content may be embedded in a track of an MPEG4 file. Alternatively, a URL may be provided in a content header which the viewing station may use to retrieve an associated PMF via HTTP or another protocol. With respect to a DVD disk, the metadata may reside on the disk, for example, in a PMF with a standard name (e.g., "program_metadata.xml"), or may be at a particular location on the disk. With respect to cable or satellite broadcast of the content, a URL, for example, may be embedded in the VBI of the broadcast. The URL may identify a location on the Internet at which the associated metadata resides, so that a settop box 115 may retrieve the metadata.

The settop box 115 may be in communication with an input device 530 for allowing user input. The input device 530 may include a keyboard, mouse, trackball, remote control, or any other type of input device.

The settop box 115 may also be in communication with a display/rendering device 120. In one embodiment, the display/rendering device 120 may include a video output and/or an audio output for displaying/rendering permitted content.

In an example embodiment of the present invention, the network 110 may be a cable television network within which an example demand telecasting service suitable for the present invention may be implemented. The content provider 105 may be a cable television telecasting facility. A communication medium 16 may couple the cable television content provider 105 to viewing stations, which may include, e.g., the settop boxes 115a-115n and the display/rendering devices 120a-120n. The communication medium 16 may be any medium that is suitable for delivering signals over long distances between the content provider 105 and the viewing stations. The communication medium 16 may be fiber optic cable, although other media (such as coaxial cable) may be used instead.

In many respects, network 110 may operate in a conventional manner to make video programs available for viewing at the viewing stations. The content provider 105 may include a central transmitting station that transmits video programs to viewing stations via communication medium 16.

The content provider 105 may telecast a plurality of video programs simultaneously over a plurality of programming channels on the communication medium 16. With reference to FIGS. 1 and 2, all viewing stations 14 on the network 110 may have access to the plurality of programs that are telecast by the content provider 105. A user can view a particular video program by tuning one of the viewing stations 14 to the programming channel that is carrying the program of interest.

However, unlike some conventional unidirectional telecasting networks, the network 110 may permit bi-directional communication between the content provider 105 and each viewing station 14 over the communication medium 16. In an example embodiment of the present invention, one or more of a plurality of programming channels may be used for interactive applications, for example for a demand telecasting service suitable for the present invention.

When the user tunes one of the viewing stations 14 to an interactive channel, commands may be sent from that viewing station 14 to the content provider 105. As described in detail below, such commands may include a program selection command that may cause the content provider 105 to telecast a program of interest on the interactive channel substantially at the time that the command is transmitted. Although all viewing stations 14 may receive all of the signals telecast on the interactive channel, the system and method may provide that only the viewing station 14 that via which a particular program is selected displays the selected program, and that use of the interactive channel by one of the viewing stations 14 does not interfere with the use of the interactive channel by another one of the viewing stations 14. Thus, many different viewing stations 14 on network 110 may be used to view different interactively selected programs at the same time.

Figure 3:
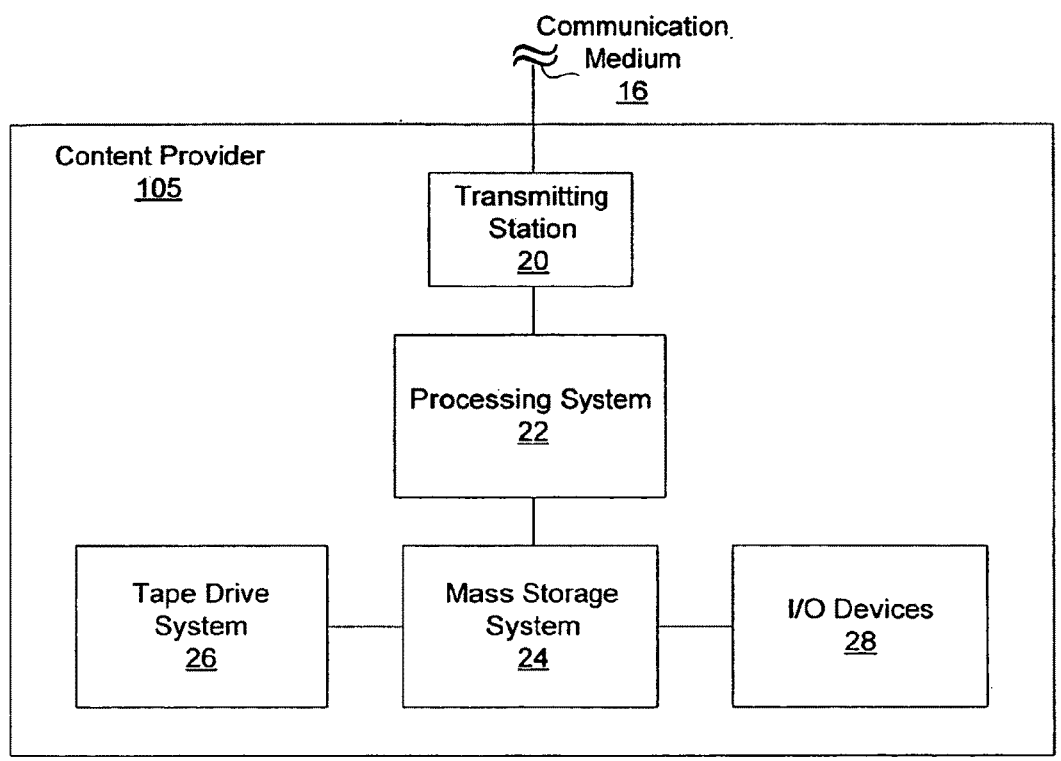
FIG. 3 is a block diagram illustrating components of a telecasting facility.

Referring now to FIG. 3, an embodiment of a content provider 105 is described that may be suitable for use as a demand telecasting facility. As mentioned above, the telecasting facility may include a transmitting station 20 that transmits video programs to viewing stations 14 (FIG. 2) over a plurality of programming channels on the communication medium 16 in a conventional manner. However, in order to implement the demand telecasting service of the present invention, the telecasting facility may also includes a processing system 22 coupled to the transmitting station 20, a mass storage system 24, a tape drive system 26, and conventional I/O devices 28 (such as a keyboard, display monitor, and mouse). Mass storage system 24, tape drive system 26, and I/O devices 28 may be considered peripheral components of processing system 22.

Processing system 22 may be a multiple processor computer system that is capable of handling many programming requests that may be received from viewing stations 14 over communication medium 16 on the interactive channel. Such requests may be initially received by the transmitting station 20 and may be subsequently passed on to processing system 22. In one example embodiment, the processing system 22 may be a network of at least eight Challenge computer systems available from Silicon Graphics, Inc., located in Mountain View, Calif. Each Challenge computer may be equipped with at least eight processors operating in parallel, thus providing the processing system 22 with at least 64 processors for handling programming requests.

The mass storage system 24 may include an array of high performance disk drives. Alternatively, other types of data storage systems can be used, such as CD-ROM systems.

The tape drive system 26 may be a multi-component system that includes a tape storage unit (not shown), a plurality of tape players (not shown), and an automatic tape retrieval unit (not shown). In one example embodiment, when a request for a video program is received, the processing system 22 may instruct the automatic tape retrieval unit to retrieve the tape containing the selected video program from the appropriate location in the tape storage unit. The automatic tape retrieval unit may then insert the tape into an available tape drive, which in turn may play the tape to be telecast. As the tape is played, the video program data (video and audio) may be transferred to the mass storage system 24 for temporary storage, after which the program may be telecast to the viewing station 14 from which the user made the selection. When the tape has finished playing, the automatic tape retrieval unit may return the tape to the appropriate location.

The tape drive system 26 may accommodate professional recording tapes, such as digital linear tapes (DLTs), although systems which accommodate other types of media (such as conventional video tapes, digital audio tapes (DATs), video disks, etc.) may be used instead. A suitable automated tape drive system that uses DLTs is available from Digital Equipment Corporation, located in Maynard, Mass. It should be noted, however, that a manual tape storage and retrieval system may be used without departing from the spirit of the invention.

In an embodiment of the present invention, the content provider 105 may receive tapes (files) containing the video and audio portions of new video programs on a periodic basis (e.g., monthly). The video portion of each video program may be stored in a compressed format in accordance with the MPEG video compression standard established by the Motion Picture Experts Group. The tapes may be loaded into the storage unit of the tape drive system 26, into locations that may be predetermined by the supplier of the tapes. If a particular predetermined location is occupied, another location may be used, as long as the processing system 22 has information reflecting the actual tape location.

The mass storage system 24 may store many data files used in connection with the demand telecasting service of the present invention. These data files may include data files for storing the video and audio portions of frequently selected video programs, data files for storing the video and audio portions of full-motion previews from the available video programs, and/or data files for storing still images from the available video programs. The mass storage system 24 may also store additional data (described below in connection with FIGS. 4 and 5) associated with each available video program and each subscribing viewing station 14. Further, as mentioned above, the mass storage system 24 may temporarily store data files containing the audio and video portions of programs that have been transferred from tape in response to user selections.

The still image data and the video portions of the full-length video programs and full-motion previews may be stored in a compressed format in accordance with the MPEG standard.

The full-motion preview data and the still image data may be received on tape along with the tapes containing the corresponding full-length video programs. The full-motion preview data and the still image data for each available program may be transferred to the mass storage system 24 at the time the corresponding video program tapes are loaded into the tape storage unit of the tape drive system 26.

When a video program needs to be retrieved from the tape storage unit, the user may experience a noticeable delay between the time of selection and the time the program is exhibited. By storing the data for frequently selected programs in the mass storage system 24 on a long-term basis, the content provider 105 may be able to service requests for such programs more rapidly than would otherwise be the case. Indeed, if there is sufficient storage space, it may be preferable to store the entire program library in the mass storage system 24, to eliminate the delays associated with the use of the tape drive system 26.

The processing system 22 may receive requests for available video programs from viewing stations 14. In a large telecasting network, the processing system 22 may be called upon to service a large number of requests within relatively short periods of time. In order to promptly service a large number of requests, the processing system 22 may use the asynchronous transfer mode (ATM) protocol to manage data flow on the communication medium 16. In accordance with the ATM protocol, the content provider 105 and each viewing station 14 may be assigned time slots during which they are permitted to transmit data on communication medium 16. Data to be transmitted by a particular device may be buffered by that device in a conventional manner until its time slot is reached. When its time slot is reached, the transmitting device may transmit the data, along with an address that identifies the device that is to receive the data.

When large amounts of data need to be transmitted, such as when the content provider 105 transmits an entire video program to a viewing station 14, the data may be divided into smaller packets which are transmitted during different time slots. Each packet may be transmitted with a destination address. The destination device may receive and reassemble the packets as required. The content provider 105 may transmit packets at a rate that allows the receiving viewing station 14 to present an uninterrupted video program to the user.

Figure 5:
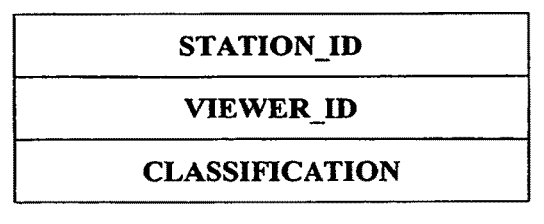

FIGS. 4 and 5 are tables that list data items that are representative of data that may be stored in the mass storage system 24 (in addition to the files containing the full-length video data, the full-motion preview data, and the still image data). The data represented by the tables shown in FIGS. 4 and 5 may be stored in conventional database tables.

The data items listed in FIG. 4 represents data stored in connection with a stored video program. This type of data may be transferred to the mass storage system 24 each time a new video program tape is received by the content provider 105. This may be accomplished through a tape transfer (similar to the full-motion preview data and the still image data), or through a direct transfer from the video program supplier (e.g., through a modem connection).

The data item "PROGRAM_ID" may represent a unique identifier that is associated with each available video program. As explained below, user requests for video programs may be accomplished by the transmission of the PROGRAM_ID associated with the desired program from one of the viewing stations 14 to the processing system 22. A numerical identifier may be used as the PROGRAM_ID to facilitate rapid processing of user requests.

The data item "PROGRAM_NAME" may represent a text field that contains the commonly known name of an available video program.

The data item "CATEGORY" preferably represents a text field that contains the name of one of several categories to which a video program may be assigned. Typical categories for video programs may include "action," "drama," "sports," etc. In one embodiment, the CATEGORY field can support multiple category assignments for a single video program. Thus, some video programs may appear in the program listings for two or more categories. For example, a recently released comedy program may be assigned to a "comedy" category, as well as to a special category designated "new releases."

The data item "CLASSIFICATION" may be used to further categorize each video program. One particularly useful classification scheme may distinguishes video programs that are suitable for children from those that are not.

The data item "DESCRIPTION" may represent a text field that contains information that may be helpful when searching for a particular video program of interest. Some examples of this type of information may include the names of the performers, the name of the director, the length of the video program, and/or a brief description of the content of the video program. Other useful information may be added, as appropriate.

The data item "STILL_IMAGE" may represent a text field that contains the name of a data file stored in the mass storage system 24 that contains image data that is used to provide the user with a still image from a video program. The still image may be provided to the user (in a manner described below) as an aid to selecting a program of interest.

The data items "PREVIEW_VIDEO" and "PREVIEW_AUDIO" may be text fields that represent the names of data files stored in the mass storage system 24 that contain the video and audio portions of a short segment of a video program. The short segment of the video program may be provided to the user (in a manner described below) as an aid to selecting a program of interest.

The data items "FULL_VIDEO" and "FULL_AUDIO" may be text fields that represent data that are used by the processing system 22 to determine the location of a selected video program. If the video program is one that is stored on a long-term basis in the mass storage system 24, the FULL_VIDEO and FULL_AUDIO data items may represent the names of the data files containing the full video and audio portions of the video program. Otherwise, the FULL_VIDEO data item may represent a location in off-line storage, e.g., the tape storage unit of the tape drive system 26 where the tape containing the video program is stored. The FULL_AUDIO data item is not used in this situation.

The data items listed in FIG. 5 may represent data that pertain to viewing stations 14 that are connected to the network 110. This information may be entered, e.g., by an operator using the I/O devices 28.

The data item "STATION ID" may represent a numeric field that contains a unique identifier for each viewing station 14 that has subscribed to the demand telecasting service suitable to the present invention. The station identifiers may be used by the processing system 22 as the destination addresses for data packets transmitted on communication medium 16.

The data item "VIEWER_ID" may represent a text field that contains a unique identifier for each person that is permitted to use a particular viewing station 14.

The data item "CLASSIFICATION" may be similar to the data item of the same name described in connection with FIG. 4. However, the CLASSIFICATION field of FIG. 5 may be for defining the classes of video programs that a particular user (as identified by the VIEWER_ID) is permitted to watch.

Figure 6:
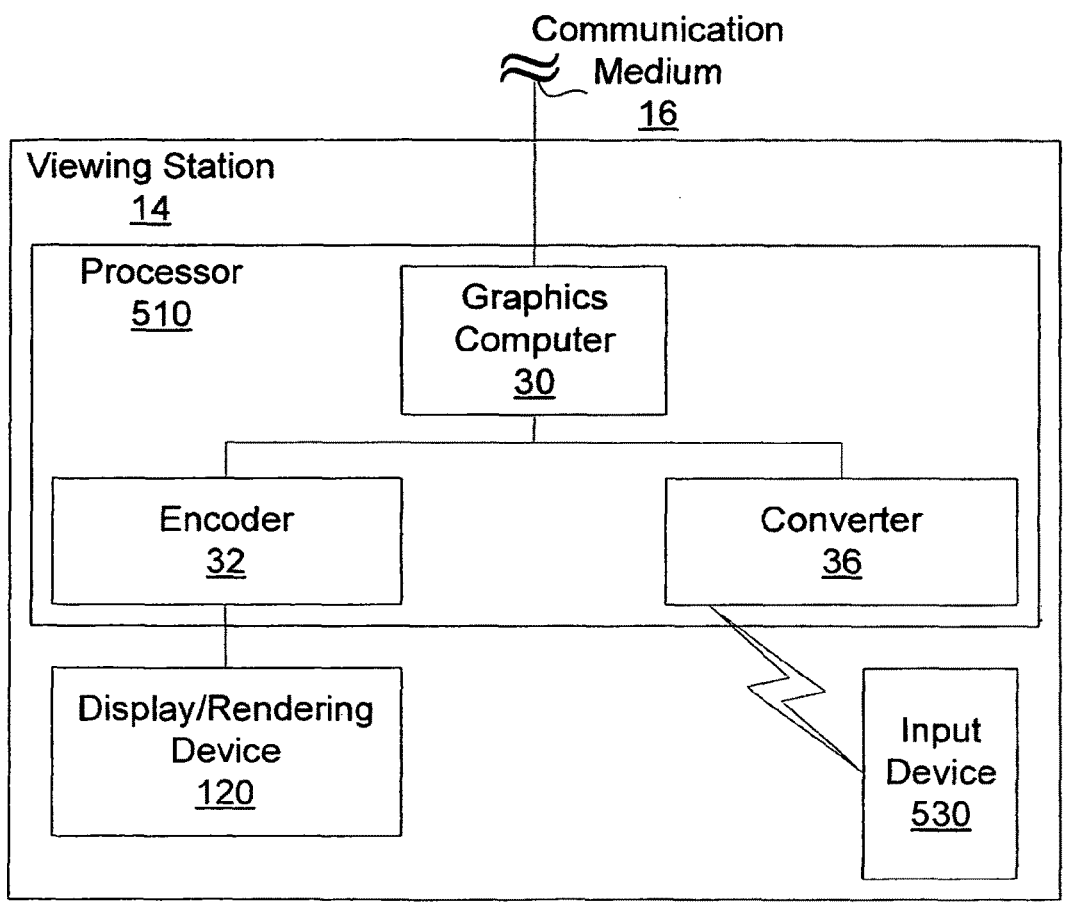
FIG. 6 is a more detailed block diagram of the viewing station shown in FIG. 2, according to an example embodiment of the present invention.

Referring now to FIG. 6, further details of the viewing station 14 according to one example embodiment are described. The processor 510 may include a graphics computer 30, a video encoder 32, and a signal converter 36. The display/rendering device 120 may include a television monitor 34, and the input device 530 may include a remote user control unit 38. It should be understood that some or all of these components, especially the graphics computer 30, the video encoder 32, and the signal converter 36, may be combined into a single device or may be arranged as separate devices.

The graphics computer 30 may perform the graphics functions required to implement the interactive interface suitable to the present invention. The graphics computer 30 may also perform the communications functions for viewing station 14, including transmitting data packets to, and receiving data packets from, the content provider 105. The graphics computer 30 may be an R4000PC Indy computer available from Silicon Graphics, Inc. The Indy computer may be equipped with 8 megabytes of memory, a Newport graphics card, and an A/V card which may provide an audio and video interface between the graphics computer 30 and the signal converter 36.

The graphics computer 30 may receive several different types of information in packets from the content provider 105 over the interactive channel on the communication medium 16. This information may include the video and audio portions of video programs selected by the user, the video and audio portions of short segments of the video programs, still images from the video programs, textual descriptions of the available video programs, and listings of the available video programs. As explained below, this information may be presented to the user through the use of a convenient interactive interface.

Information received by the viewing station 14 may be initially processed by the graphics computer 30. Such processing steps may include reassembling of data packets, decompression of the compressed video portions of the video programs and short segments of the video programs, and synchronization of the video and audio portions of the video programs and the short segments of the video programs. These processing steps may be performed in a conventional manner.

The information processed by the graphics computer 30 that is to be made available to the user (e.g., video programs, short segments, still images, program lists, etc.) may be sent to the video encoder 32. The video encoder 32 may be a 2826 Video Encoder II available from RasterOps, Inc., located in Santa Clara, Calif. The video encoder 32 may convert the information from the native format of the graphics computer 30 to a television standard format such as NTSC, PAL, or SECAM, as appropriate. Converting the information to the appropriate format may render the information suitable for viewing on the conventional television monitor 34.

The user can communicate with the graphics computer 30 through the use of the combination of the signal converter 36 and the remote user control unit 38. In many respects, the control unit 38 may be similar to conventional remote control units that are commonly used with audio-visual equipment. However, the control unit 38 may include specialized buttons that are used in connection with the interactive interface of the present invention.

The control unit 38 may transmit infrared signals to the signal converter 36 in response to commands entered by the user. The signal converter 36 may receive the infrared signals and convert them to electrical signals suitable for transmission to the graphics computer 30. The signal converter 36 may be an 8600 Converter available from Scientific-Atlanta, Inc., located in Atlanta, Ga.

The graphics computer 30 may be programmed to provide an interactive interface that is intended to facilitate the user's selection of a video program. The interactive interface may facilitate the user's program selection by organizing the programs available for selection into a convenient format, and by providing the user with helpful selection aids, including still images, short segment previews, and textual descriptions of the available programs.

Figure 7:
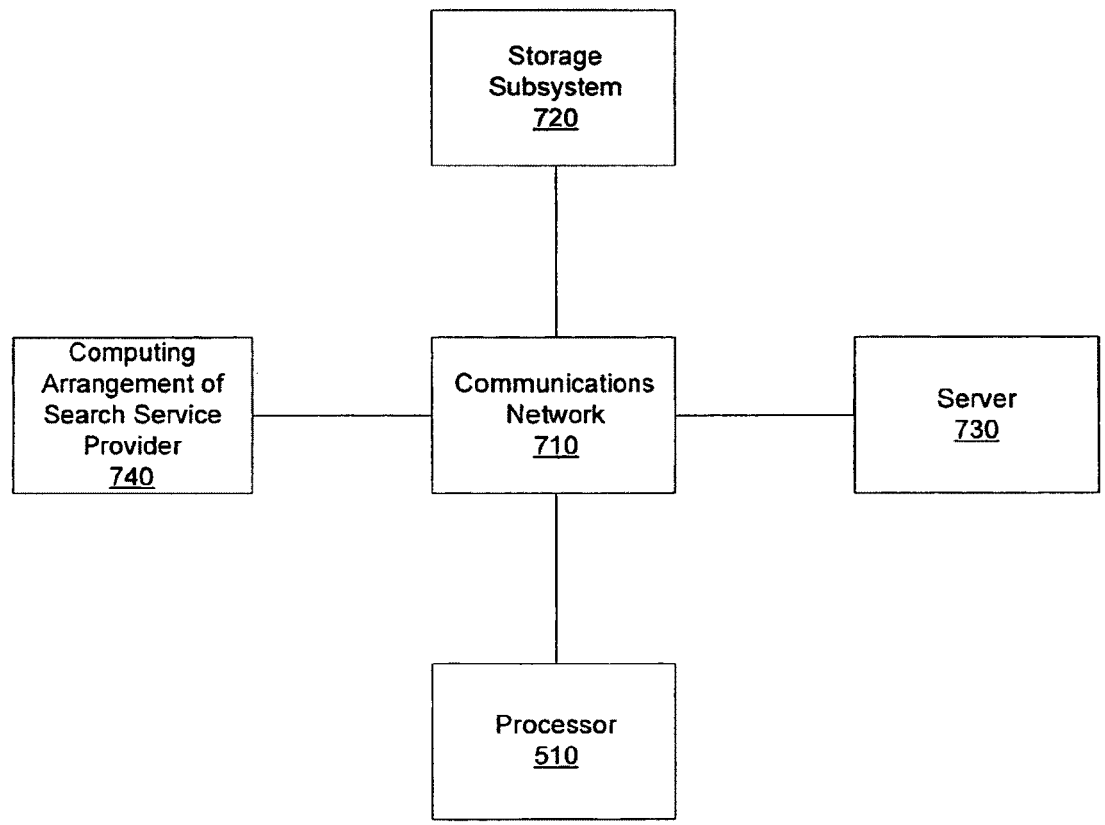
FIG. 7 is a block diagram illustrating components of an example system that may compile customized "What's next" data/content for display at a user's viewing station, according to an example embodiment of the present invention.

FIG. 7 is a block diagram of an example system suitable to the present invention. In this system, a user's processor 510 (e.g., of a computer or of a set-top box 115 connected to a display/rendering device 120, e.g., that includes a television monitor 34) may be connected to a computer arrangement of a search service provider 740 (e.g., a server including a search engine) via a communications network 710 (e.g., the Internet, a cable network, a telephone or cellular network, a wired or wireless computing network, etc.). The user's processor 510 may store the user profile, described above, in the storage medium 520 of the viewing station 14 (although the user profile may also be stored in other locations such as, for example, at the computing arrangement of the search service provider 740). The search service provider 740 may be a part of one of a plurality of content providers 105, or may be separate from any content provider 105. The communications network 710 may be the same as the network 110 via which the viewing station 14 is connected to the content provider 105, or may be a different network.

In operation, a search engine at the computer arrangement of the search service provider 740 may search the appropriate databases for information regarding media content, based on at least one search criterion and based on the User's Profile. The databases may be located remote from the computing arrangement of the search service provider 740, for example, at a storage subsystem 720, at another server 730, or may be local to the service provider.

Results of the searches may be displayed to the user at the display/rendering device 120.

The system may be configured in many different ways. For example, the search engine may execute at the viewing station 14.

Figure 8:
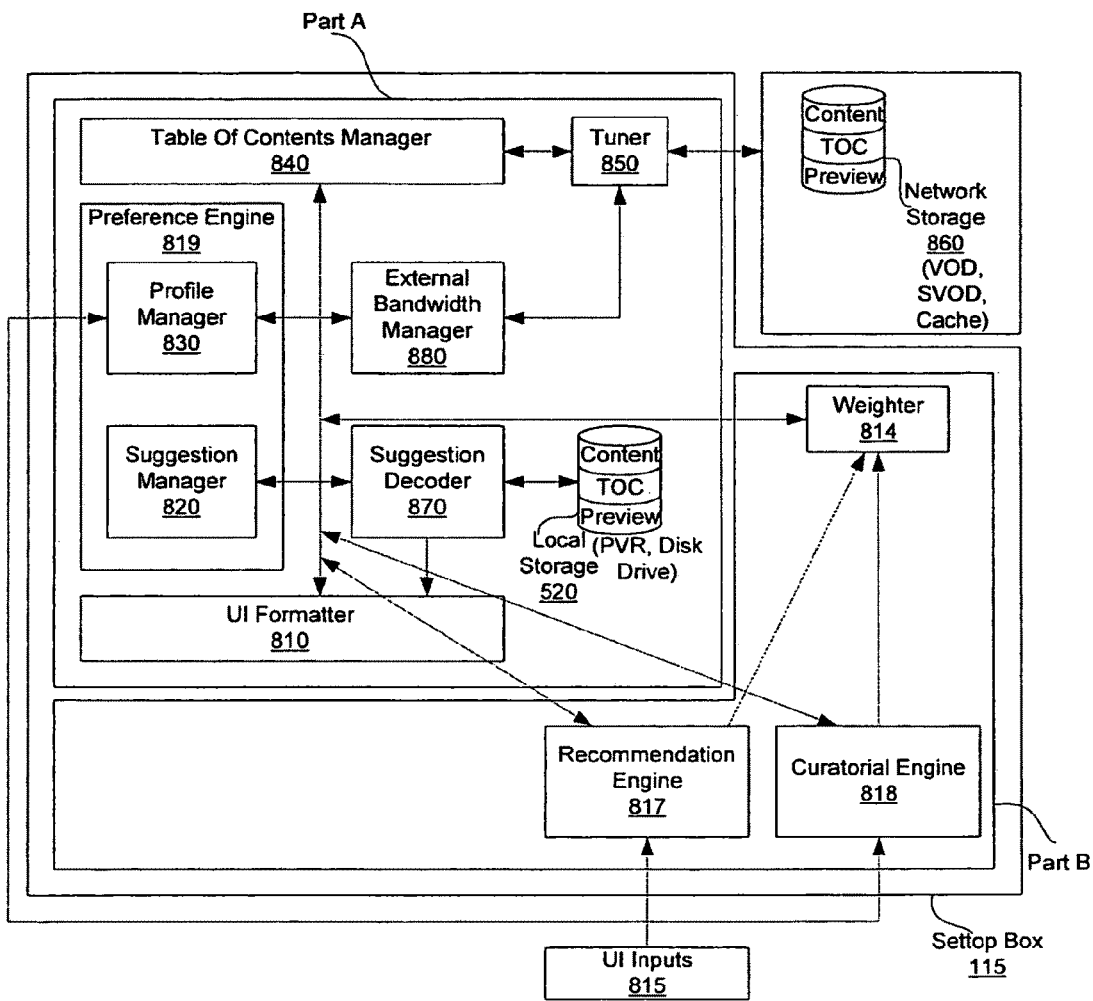
FIG. 8 is a block diagram illustrating system components for managing a profile and presenting customized "What's next" data/content of one or more content providers based on the managed profile and a plurality of search engines, according to example embodiments of the present invention.

FIG. 8 illustrates an example embodiment of a system for viewing according to the present invention. The system illustrated in FIG. 8 combines various elements and processes. This example embodiment of the system according to the present invention includes software process modules implemented on a cable settop box 115 of a viewing station 14 with an integrated PVR (personal video recorder or hard-drive) such as the Scientific Atlanta Explorer 8000. Other settop box designs may support the present invention including DirecTV "TiVo" or Echostar "DishPlayer," as well as PC-based configurations.

In one example embodiment of the present invention, the settop box 115 may include a system shown in part A of FIG. 8. The user interface (UI) elements may be created in a UI formatter 810. The UI formatter 810 may be a software suite such as Macromedia Flash, Microsoft Windows or other Graphical User Interface (GUI) software.

The example system may include a software module called "Suggestion Manager" 820 (further described in connection with FIG. 12). The Suggestion Manager 820 may have inputs and outputs of metadata (i.e., pre- and post-filtering and sort/ordering) as well as inputs from a "Profile Manager" 830 which may indicate the consumer's preferences and desired program attributes.

In the example embodiment, the Profile Manager 830 may manage the profile of a user or user preferences in a number of ways. For example, the Profile Manager 830 may allow the user to provide express user settings, e.g., by utilizing a User Settings input screen to define the various parameters (criteria, preference values, etc.) that indicate the user's viewing preferences. The user may, for example, be provided with menus in order to set genre preferences (e.g., comedy, mystery, action, romance, music, documentary, sports, etc.), actor preferences and/or director preferences. The user may also be prompted to provide demographic information (age, gender, residence, etc). Also, the user may be prompted to set a "Cost of Obtain" parameter and a "Time to Wait" parameter. The user may define the Cost to Obtain parameter in order to specify the amount of money the user is willing to pay to purchase programming. The Time to Wait parameter may be defined by the user in order to specify the amount of time the user is willing to wait before being able to view an airing of a program (e.g., movie, television show, concert, etc.).

Figure 9:
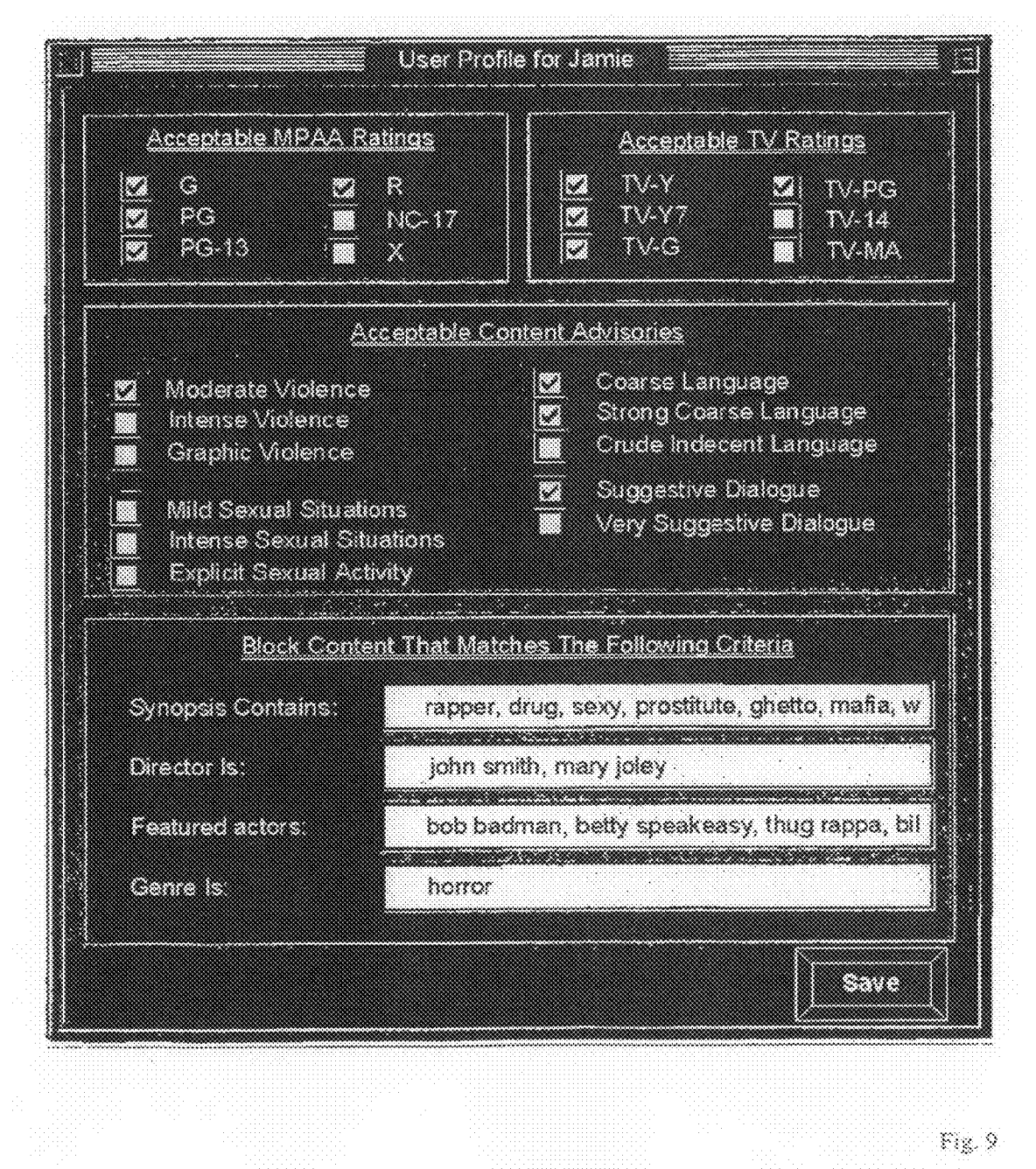

After logging into the system, the user may create and/or modify profiles using, for example, a graphical user interface. FIG. 9 shows one example of a screen for configuring a profile. The user may select appropriate filtering criteria for a particular user profile (in this case for user "Jamie" or for the default profile). For example, the user may select acceptable MPAA and TV ratings by selecting (via an input device such as a mouse, keyboard, keypad, etc.) the appropriate check box. Also, the user may select acceptable content advisories, and may input blocking criteria. A username and password may be associated with each of the individual user profiles.

An Account Manager system may also allow an authorized user to change various system settings. For example, a system of a viewing station 14 may set a particular stored profile as a default profile. If a user logs into the system another user profile associated with the user may be activated. After the user views a program, the system may then automatically revert back to the Default profile.

In an example embodiment, the Profile Manager 830 may "observe" and record activities within the settop box 115 such as viewing programming on linear or non-linear (e.g., VOD), channels, and may store information regarding such information. For example, a list of programs viewed, and a time duration of such viewing, e.g., where the time duration is less than that of the viewed program, may be stored. Other observed activities may be, for example, those performed for setting user profiles or modifying search engine output weightings. These observations may then be used, for example, for formulating filtering parameters. When determining which of the available titles to display, the titles may be at least partially filtered based on the observations. For example, if a user always watches particular news programs and never watches sitcoms, titles of sitcoms may be omitted, but "suggested" news programs including news programs other than those the user normally watches, may be included.

The system may also include a software module called "Table of Contents Manager" (TOCM) 840 that may perform the task of processing and ordering all of the content and content data that is currently available to the user (or could be available via external request, download, purchase, etc.). The TOCM 840 may receive inputs from a plurality of sources. The inputs may be channel data such as EPG data and metadata (conventional cable- or satellite-provider metadata indicating what is on-air and on what channel that content is present), in-band metadata (provided within the analog or digital content stream from the content provider), and out-of-band metadata, e.g., Broadcast File System (BFS) data providing metadata about content available via S-VOD or other VOD sources. The TOCM 840 may also be provided with out-of-band augmentation metadata, e.g., Internet/XML data. The TOCM 840 may be provided (by, for example, a service and/or content provider) with metadata associated with content (programs) that is available to the user via download or data streaming, may be able to search the Internet for content that is available to the user via download and/or data streaming, and may be capable of making content requests over the Internet or other network for content to be recorded on the PVR disk. As described below, in one embodiment, the Profile Manager 830 and the Suggestion Manager 820 may comprise a preference engine of the TOCM 840.

In the example embodiment, the system also includes a traditional tuner module 850 for receiving (and/or sending) data, content (programs), analog or digital television, etc.

A network storage system 860, e.g., of one or more content providers 105, may also be included in the system, e.g., a VOD (or SVOD) server system such as the Concurrent Computer Corp. "Media Hawk" VOD server. The network storage system 860 may store content (essence (e.g., audio/video) and metadata), previews, and other content.

The storage medium 520 may accommodate the storage, recording, and playback of content (metadata and essence) and of table of content information, and may be able to capture for playback preview content. The system may also include within the settop box 115, an MPEG decoder 870 that may process and provide full-motion full or partial screen video (and audio).

A software module called "External Bandwidth Manager" 880 may: a) tune channels to obtain content currently on-air; b) make requests to S-VOD or VOD servers; and/or c) make requests for purchase and/or download of content not available. Requests for content may also be for purchase of physical media.

FIG. 10 provides detail regarding the program data that may be used by the system illustrated in FIG. 8, in addition to that already described with reference to FIG. 4. FIG. 10 illustrates data types and metadata elements (or fields) that may be used by the system illustrated in FIG. 8. The data types may include an EPG data 1000, a TOC network data 1001 of externally available programming, a TOC local data 1003 of locally stored programming, an extended metadata 1005, and a future data 1007 regarding content that will be available at a future time. These metadata elements may describe the content (e.g. actors, genre) and add a "weighting factor" to link the traditional metadata field with a weight of how germane that metadata field is to the content (program). For example, a metadata field (or category) "Gay" (representing a storyline about Gay/Lesbian themes) of the extended metadata 1005 may also be assigned a "weight" or value (shown here as 4.1), which would indicate (on a scale of 1 to 10) that the storyline is "less than half" themed on Gay topics. The weight of 8.7 associated with "Female" might be so strong as to indicate a storyline about feminist issues. In the "actor" metadata category, for example, an extreme "10" value (not shown) might imply a one-person-show, while a "1.0" value might be a cameo or other type of guest appearance by the particular actor. The weighting system that may be associated with metadata fields may be subjectively applied by the content provider 105 and values need only be consistent among other content and among similar metadata fields that are used in the Preference Engine (described in further detail below) and/or other modules that sort and order content for display of a list of the content.

Using the weighting, a content provider may be able to "punch through" any user-specified filters in order to more heavily favor the display of titles of those programs that are higher priorities to the content provider (e.g., for promotional, marketing, or any other reason). In one embodiment, a content provider may purposely weight (e.g., somewhat misdescriptively) a metadata field with a value that is higher than the content would otherwise be entitled in order to, for example, override or supercede user preference filters and/or other filters in the system. For example, if the content provider believes that the program is of particularly excellent quality, but is only slightly related to feminist issues, the content provider may assign a weight of "10.0" to "Female,"

particularly if the provider believes that the content or program may be of particular interest to users who are interested in feminist issues (even though the content, itself, is only slightly related to feminist issues). In another embodiment, the content provider may assign a weighting of "10.0" to all fields, so that the title of the program appears on all lists (no matter what filter is set). In another embodiment, an additional field may be included that expressly sets the content/service providers priorities. For example, such a field may be assigned a weighting of "10.0" if the programming provider wants the title of the program listed no matter what the user profile looks like. A weighting of "5.0" may indicate that the title of the program should be listed if the user profile indicates that the user is at least marginally interested in programs of a particular type.

The data of FIG. 10 may be in Extensible Markup Language (XML) format or other data formats that permit sorting, parsing, and categorization. In the example embodiment of the present invention, the following may be data types used in the system: conventional EPG data 1000 such as that currently provided by Tribune Media Services as a part of their real-time data service, Table of Contents (TOC) data 1001 such as that provided via the Broadcast File System (BFS) in the normal management of the S-A Explorer digital STB system, S-VOD systems such as Concurrent MediaHawk, TOC data 1003 provided internally to the S-A Explorer 8000 PVR system, extended metadata 1005 such as that supplied by a programming provider either via a web site or enhanced fields to currently-deployed metadata and asset systems such as the CableLabs VOD-1.0 metadata and on-demand content specifications, and another data type 1007 for future content including externally-available content such as a download request asset identifier (for example, for a consumer to request either a download of an entire season of a program or the request could be a descriptor for a commerce transaction for the consumer to order a physical copy of the content via external fulfillment).

Table of Contents Manager Module

Figure 11:
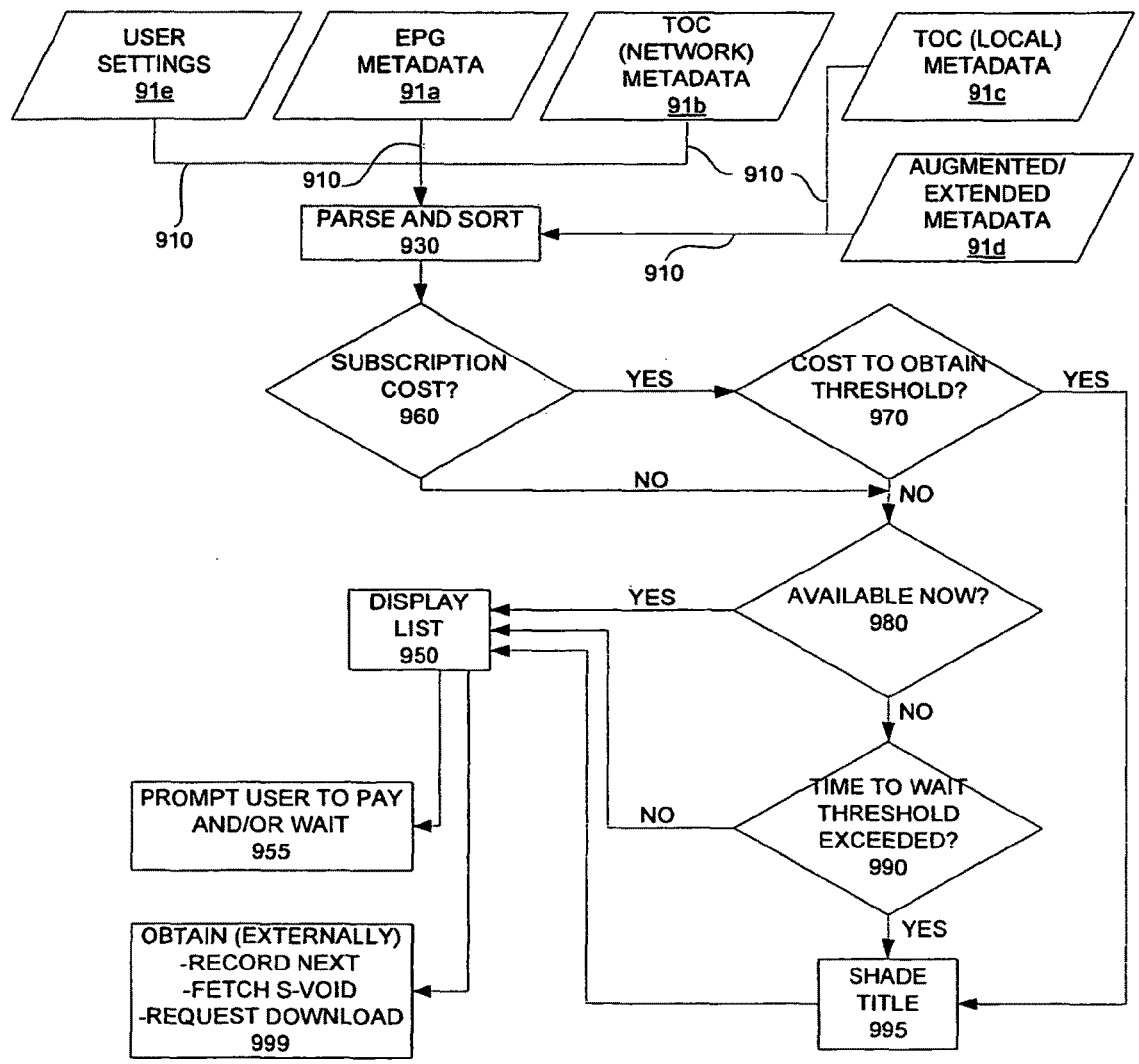
FIG. 11 is a flowchart that illustrates an example method that may be implemented by the Table of Contents Manager of FIG. 8.

FIG. 11 illustrates an example method implemented by the TOCM 840. In step 910, input data regarding programming (e.g., EPG metadata 91a, Table of Contents metadata 91b from a network, Table of Contents metadata 91c stored locally (e.g., on PVR), Augment/Extended metadata 91d, and/or User Settings 91e) may be provided to a Preference Engine (e.g., 819 of FIG. 8). The input data regarding programming 91a, 91b, 91c, 91d, 91e may include metadata associated with programming that is immediately available, e.g., via download or datastreaming, i.e., on-air metadata, or with programming that will be available in the future, i.e., future metadata.

In step 930, the Preference Engine 819 may parse the input data to determine its relevance to a user in light of the user's set preferences and sort the input data in terms of the particular content of the programming and metadata weights of relevance. The Preference Engine 819 may sort the input data to determine a list of programming titles for a list to be provided at step 950. The TOCM 840 may generate an ordered-list of content that is the calculative outcome of relevance to the user based on the result of the Preference Engine's analysis in step 930. The Preference Engine 819, in step 930, may determine the user's desire for a particular piece of content by analyzing user preferences, metadata values, and the content's availability to the user (e.g., currently on-air, currently on-disk, available by free request, available by low-cost, fast, download, or available by necessary subscription or cost).

If the content is available with no further cost and immediately available to the user, the TOCM 840 may proceed to step 950 where a "Now Playing" list may be displayed to the user. Prior to step 950, determinations regarding the content's availability may be made. In step 960, a determination may be made as to whether the content is available only with further cost to the user (e.g., available via a subscription or a one-time fee). If the content is not freely available to the user, a determination may be made in step 970 as to whether the cost is below the user's "Cost to Obtain" threshold parameter. If not, the title of the content may be shaded in step 995 and the TOCM 840 may add the shaded title to the Now Playing list for display to the user in step 950. If the cost is below the "Cost to Obtain" parameter threshold or if it is determined in step 960 that the content is freely available to the user, a determination may be made in step 980 as to whether the content (programming) is available now to the user. If so, the title may be added to the Now Playing list for display to the user in step 950. If it is determined in step 980 that the content is not immediately available to the user, the TOCM 840 may proceed to step 990 and determine whether the content will be available within a time below the user's "Time to Wait" threshold. If not, the title of the programming may be shaded in step 995, and the shaded title may be added to the Now Playing list for display to the user in step 950. If the programming is available at a time below the "Time to Wait" parameter, the TOCM 840 may add the program's title to the list without shading the title in step 995. In an example embodiment of the present invention, a shaded title may indicate to the user that although the programming associated with the title may be of interest to the user, it is only available for further cost and/or a longer waiting time than the user's threshold settings.

In step 999, external content acquisition mat be performed based on a user request. For example, the user may request to view programming listed in the list that is displayed in step 950. The system of the present invention may acquire the programming, for example, by tuning the user's set-top box to the appropriate channel airing the desired programming. Also, the system may acquire the programming by performing the external content acquisition in step 999 such that the desired programming is obtained via S-VOD, VOD, a download service, a media streaming mechanism, or by retrieving a (previously recorded) program from a PVR. If a user selects a shaded title, the user may receive further information regarding the additional cost of the programming and/or the amount of time the user will have to wait for the programming. The user may also be prompted to pay for the content (or subscribe) and/or to wait in step 955.

Profile Manager Module and Suggestion Manager Module

Figure 12:
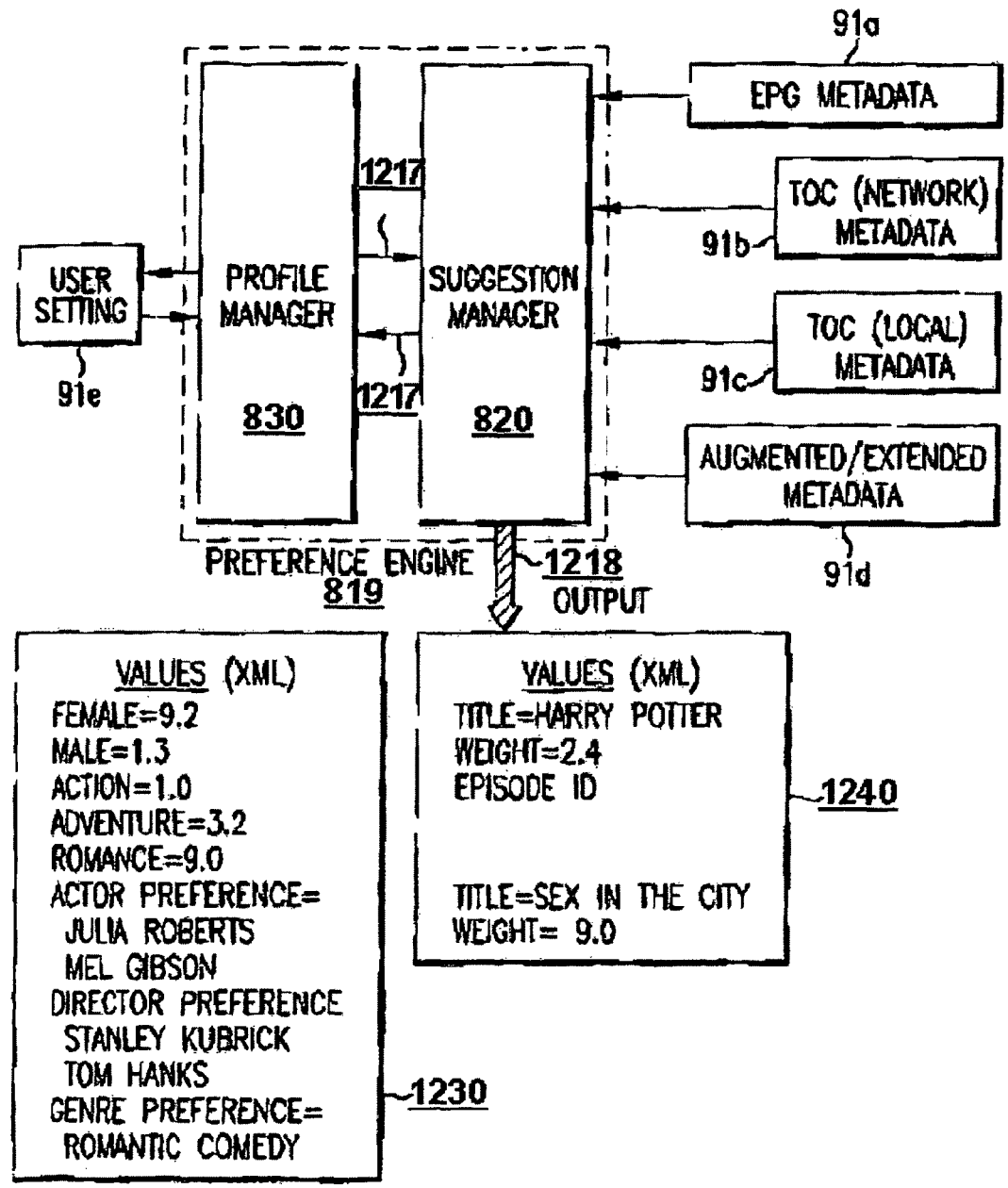
FIG. 12 illustrates an interaction between a Profile Manager module and a Suggestion Manager module, according to an example embodiment of the present invention.

FIG. 12 illustrates an interaction 1217 between the Profile Manager 830 and the Suggestion Manager 820, according to an example embodiment of the present invention. The combination and interaction 1217 of the Profile Manager 830 and the Suggestion. Manager 820 may form the Preference Engine 819.

The Profile Manager 830 may determine what the user "wants" by managing a User Profile 1230 and conveying an indication of what the user "wants" to the Suggestion Manager 820. The User Profile 1230 may include preference values set by the user via User Settings 91e, and/or preference values set or determined by the Profile Manager 830 based on (e.g., implied by) observed actions of the user (e.g., based on the viewing history of the user). In the example embodiment of the present invention, the preference values may be represented in the User Profile 1230 in the XML format as weightings, values or descriptions for various categories such as actor preferences, director preferences, and genre preferences. The User Profile 1230 may be the indication of what the user "wants" that the Profile Manager 830 provides via interaction 1217 to the Suggestion Manager 820.

In this embodiment, the User Settings 91e (e.g., weightings or values for categories such as actor preference, director preferences, genre preferences, etc.) may allow a user to expressly convey or set his or her preferences using, for example, dialog boxes/UI elements which may include "fill-in-the-blank" form-type data entry, interactive "Wizard" type guided/interview questions, or values set by setting a "slider." Some preferences of the User Profile 1230 may be implied by other set values (e.g., high levels for several male actors might set or modify an internal setting for the preference value "male"), or be derived based on the viewing history of the user.

The User Profile 1230 may also indicate what programming is available to the user. For example, the User Profile 1230 may include information regarding an identification of the particular cable or satellite service to which the user subscribes, information as to whether or not the user's STB is configured to access the Internet for downloading and/or datastream programming, information as to whether or not the user's STB can accept removable media such as an optical disc or magnetic media), etc. Such information could be set by the user (e.g., via the User Settings 91e), or determined by the Profile Manager 830.

The User Profile 1230 may be updated from time to time (occasionally, periodically, etc.). For example, if a new preference value (e.g., a new category) is to be set, the Profile Manager 830 may prompt the user to input preference information. The Profile Manager 830 may also adjust values, for example, as the system configuration and/or implied user preferences, etc., change.

The Suggestion Manager 820 may receive user profile information (e.g., the User Profile 1230 or information derived therefrom) from the Profile Manager 830. Based on this information, metadata values (described above) associated with available programming or content, and/or priorities of the service provider, the Suggestion Manager 820 may determine which programming should be listed (e.g., suggested) for the user, e.g., in step 950 of FIG. 11, including, for example, the order of the titles. In an example embodiment, the listed programming may include content that is available to the user and that fits or corresponds to the user profile information and/or is to be "punched-through" (e.g., content that does not fit the user information but meets some other priority of the programming provider).

It may occur that, at times, the Suggestion Manager 820 is not be able to determine which content fits the user profile and/or which content is to be "punched-through" based on a metadata value. As a result, the Suggestion Manager 820 may interact 1217 with the Profile Manager 830 in order to have the Profile Manager 830 re-determine the weightings (e.g., scale weights) and/or values for the user settings and for the implicitly-observed descriptions based on actions of the user that are stored in the User Profile 1230.

In response to the interaction 1217 by the Suggestion Manager 820 requesting the re-determination of weightings, the Profile Manager 830 may set additional preference values that may be pertinent to the metadata values of the content for which the Suggestion Manager 820 seeks to determine the content's suitability to the user. For example, such additional preference values may be set based on observations of the user's past viewing behavior and/or on explicit entries by the user.

In one example embodiment, the Profile Manager 830 may pro-actively quiz the user. For example, the Profile Manager 830 may present the user with, and request the user to rank, a set of content selections. The Profile Manager 830 may present the user with additional questions concerning the user's preferences for typically and/or currently available content.

The need for the re-determination of weightings may arise, for example, where the Profile Manager 830 has data that narrows down the suitability of content to one of a plurality of large sets of content, but where the one large set includes that which is determined by the Suggestion Manager 820 to be too large a set to be of use to the user. Additional, more refined, preference values may be needed to further refine the set of selections to present to the user.

Another example of the need for the re-determination of weightings may be where the user subscribes to a particular channel package but has not previously provided preference values refined to the extent that the Suggest Manager 820 may distinguish between the suitability of the content of the particular channel package.

Another example of the need for the re-determination of weightings may be where at least one of a plurality of content choices is to be punched through. Instead of punching through all of the content choices, a single one or a few of the content choices may be punched through by selecting those that are most suitable for the user. However, it may occur that previously provided preference values do not distinguish between the content to be punched through, so that additional preference values may be required to be set in order to narrow down the number of content choices to be punched through.

FIG. 12 shows an example portion of output 1240 of the Suggestion Manager 820. This output may include titles and metadata values associated with suggested programming, and an indication of what order the titles should be displayed. This output 140 may be further processed, for example, as described above in connection with FIG. 11.

Multi-Search-Engine Interplay

In one example embodiment of the present invention, the system of the settop box 115 may be expanded to include part B of FIG. 8, in addition to part A. While the engines are illustrated in FIG. 8 as operating at the settop box 115, in an alternative embodiment, the engines may be operating externally, for example, at a content provider. Three search engines may operate independently and in parallel to dynamically create a list of selectable media content which may be based in varying degree on what the user is watching, what everyone else is watching, and what the content provider or distributor wants to show. Content providers and distributors may include, for example, cable companies, studios, broadcasters, satellite companies, Web-based sites, etc.

The search engines may utilize multiple sources of recommendations, such as usage patterns (the individual or others more globally), content provider showcases, temporal availability (now, soon), talent, friends, award winning content, mood of the user, to list a few of many possible sources of recommendations. The combined output of the engines may take the multiple sources and provide the resulting recommendations to the user based on which content sources the user would prefer to utilize.

The real-time dynamic creation of content lists may be based in large part on current viewing patterns and not solely on what users indicate their interests are (there is often a disparity between actual user activity and self reported recommendation). Such user self-reporting typically results in static playlists, which more often than not are based on pre-defined categories of programs (e.g., comedies, dramas, etc.) which a content provider/distributor thinks will match a user's preferences.

For example, watching particular channels may be considered a pattern, such that, e.g., everyone who watches both ESPN and Comedy Central may be presented with certain HBO content selections. Patterns may be tracked by the user's viewing station or externally, for example, by content providers.

In an embodiment of the present invention in which the settop box 115 includes an expanded system of parts A and B of FIG. 8, the Preference Engine 819 may perform searches based on the user's past and current content selections and patterns of viewing. For example, searches by the Preference Engine 819 may be based at least in part on the user's duration of watching programs, under the assumption that a user will spend more time watching the kinds of programs that the user likes.

In an example embodiment of the present invention, the Preference Engine 819 may perform searches based at least in part on the mood of the user. In one embodiment, the user may supply information about the user's mood to the system. For example, the user may specify that he is in a "goofy" mood. The system may be programmed to respond to this user input by presenting content choices having "whimsical" or "offbeat" metadata tags. Alternatively, the system may ask the user questions to determine the user's mood. Asking questions of the user may allow the system to more easily select a genre of program choices to present to the user. For example, if the user is in a "sad" mood and would like to be "cheered up," the system may recommend content chosen from the "comedy" genre. The system may also be able to infer user mood from key stroke patterns and/or control command sequences entered by the viewer. For example, after determining user "mood" from a Q&A session, the system may record user keystroke patterns and/or command sequences for use in inferring the same mood upon observing similar viewer keystroke patterns and/or command sequences later. For example, a keystroke pattern, by a particular user, of continuously pressing the up/down channel keys to cycle through all of the available channels may be associated with a "sad" mood. Similarly, a "relaxed" mood may be inferred when buttons are pressed at a certain rate slower than the same user's pressing of buttons at other times, or when fewer errors are made by the user. An error can be inferred, for example, where a user inputs "06" and then immediately inputs "60" and leaves the channel at "60" for a longer amount of time. In one example embodiment, the system may also be able to infer user mood using biometrics such as user eye movement behavior and/or facial expression recognition. Mood may also be inferred from the particular channels recently viewed by the user, e.g., for any amount or a prolonged amount of time.

A second search engine, referred to as a Recommendation Engine 817 in FIG. 8, may perform searches based on past and current selections of a predefined community of users, related to the user in some way (e.g., geographically or demographically). One embodiment of this engine may be thought of as an "immediacy" engine. Nielson data or other real time data regarding media selections may be incorporated to allow users to know what is popular at the moment (e.g., what's currently popular on TV or what news story on the Internet is currently most important).

A third engine, referred to as a Curatorial Engine 818 in FIG. 8, may perform searches based on the preferences of a selected reference, which may be a celebrity/media personality or demographic (e.g., what would a selected actor, director, film critic, or typical 30 year old male prefer to watch). This engine may use information available about the preferences of that celebrity or demographic. Alternatively, or by default, the third search engine may provide of list of content currently being promoted by a content provider/distributor.

In an example embodiment of the present invention, the settop box 115 may obtain the content preferences used by the different engines, for example, by downloading the information over a network, or receiving such information during a transmission by a content provider.

In an example embodiment of the present invention, for new users, the Recommendation and Curatorial Engines alone may first be used to create lists of selectable media content, because no information has yet been accumulated for the Preference Engine 819. Over time, as the user makes content selections or otherwise indicates preferences, the Preference Engine 819 may contribute to the building of the recommended content list. Additionally or alternatively, the Preference, Recommendation, and/or Curatorial Engines may base searches on information available about the new users, such as, for example, where they are from, favorite sports teams, and/or other things relevant to their living situation.

The output of the three engines may be used to help create a user profile, such as the User Profile 1230 of FIG. 12, which may be stored at a home unit or other location (e.g., at a facility of a content provider 105). The user profile created may depend on the dynamics between the three engines, which can be tailored to weight the output from each engine by a weighter 814 (e.g., each engine equal or one more highly weighted than the others). The weighting may be set by the user, the content provider/distributor, or combinations thereof. If no weighting is given, each search engine may apply its own criteria against an inventory of available media to create its own list which is then added to the others. The user can select and dynamically configure the output from the three search engines based on the user's interests at any particular moment. The user, for example, may be interested in the output of only one of the engines. The user may invoke a "counter-programming" feature in the Recommendation Engine 817 to steer away from specific content that is currently dominating the media (e.g., a hot news topic). Furthermore, the user can select or control different aspects of any one of the search engines. Additionally or alternatively, the weighting dynamics between the three engines can be based on many other factors.

In an example embodiment of the present invention, the system and method may compile reviews from multiple critics for the same content. The user may configure the system, e.g., the Curatorial Engine 818, to give different weight to the opinions of different critics. For example, the user may configure the system to give the Chicago Sun Times critic's recommendations twice the weight of those of the New York Times critic when compiling a composite critics' recommendation.

The three search engines may operate in parallel to provide more efficient and quicker displays of lists customized to a particular user than, for example, a single search engine performing the equivalent types of searches. The system and method of the present invention may reference and weight the output of more than one engine. The invention may be media independent so that the program selections provided to the user based on the user profile, including data based on output of the three search engines, may include programs of different sources. For example, a single list may include programs of linear channels, VOD programs, and locally stored programs.

In an example embodiment of the present invention, as the user configures the output of the engines, a log may record the user's selections and preferences, which may then be applied against a database for finding similar consumer behavior and generating recommendations based on that backend database. For example, the Recommendation Engine 817 or another engine may generate recommendations based on selections by those having similar consumer behavior. Additionally, recent selections may indicate a certain current preference. Based on this indication, weights applied to the different engines or to particular sets of content preferences may be automatically changed. For example, if of the last ten selected programs, all were sports programs, preferences of sports fans may be used, and a high weighting may be applied to the preferences of the sports fans.

In an example embodiment of the present invention, the screen (interface) may be dynamically reconfigured in real time in accordance with results produced by the interplay of the Curatorial, Recommendation, and Preference Engines, the weights of which may be constantly differentiated, so that the interface changes.

In an example embodiment of the present invention, all of the three engines may receive UI inputs 815 from the UI. The Preference Engine 819 may receive, for example, inputs concerning the user's current content selections, duration of watching programs, and mood. The Recommendation Engine 817 and Curatorial Engine 818 may receive inputs that allow the user to dynamically configure their outputs based on the user's interests at any particular moment.

All three engines may receive information, concerning the user's profile such as user demographics, for example, to improve the quality of searches over time. The Recommendation Engine 817 and/or the Curatorial Engine 818 may provide information to improve the user's user profile. For example if the user changes the weightings of the respective outputs of the Recommendation Engine 817 and/or Curatorial Engine 818, the patterns of those changes may be analyzed and used to update the user profile to more accurately reflect the user's interests. For example, a user might decrease the weighting of the Recommendation Engine's output concurrent with a time period during which most new TV shows premier, e.g., so that the public's short-term excitement for the new TV show does not affect the lists suggested to the user, and may increase the weighting, for example, a month after the new TV shows premiere, (or vice versa, e.g., where the user wants to be informed of new shows). The system and method of the present invention may analyze such a pattern, for example, if it is repeated over a few years, so that the system may automatically apply such a change to the weightings.

All three engines may generate search requests to acquire desired content and receive said content, via, for example, the External Bandwidth Manager 880 and/or from local storage 520. While the parsing and sorting of content and the generating of a list of steps 930-950 of FIG. 11 are discussed above with respect to the Preference Engine 819, the other search engines may similarly perform the steps of FIG. 11. For example, each search engine may use a different user profile for the parsing, sorting, generating, and outputting a list. The lists may be combined as discussed above, equally or according to varying weights.

In an alternative embodiment, a modified user profile may be maintained which includes user preferences as modified by preferences of other engines. The single user profile may be used to generate the list for display at 950.

In one example embodiment of the present invention, the output of the weighter 814 may comprise the metadata values of content choices that may be presented by the Table of Contents Manager 840 for user selection. As described above, the outputs of any combination of the three search engines may be dynamically weighted under user control by the weighter 814. Alternatively, the system may infer weightings of the various engine outputs by observing patterns of user content selection. For example, if the user rarely selects content recommended by others, the user profile may be updated, and the Profile Manager 830 may control the weighter 814 to give little weight to future Recommendation Engine outputs.

In this manner, while the addition of the Recommendation Engine 817 and the Curatorial Engine 818 may greatly expand the universe of recommendations made to the user, the system may iteratively adapt the weighting of the outputs of these engines to reduce the number of "external" recommendations to a level that is manageable by the user.

UI Screens

Figure 13:
FIG. 13 shows a welcome screen that is customized for the current user.

FIG. 13 shows a welcome screen that is customized for a current user. The current user may be identified by, for example, having the user enter a unique ID at a remote control device, and having said remote control device transmit said unique ID to the user system. Alternatively, the user may be identified by biometric means such as, for example, fingerprint recognition, retinal scanning, speech recognition, and/or user-specific keyboarding pattern recognition, e.g., by keeping track of time intervals between keystrokes, and in particular of a given keystroke sequence. Alternatively, the current user may be recognized by association with, for example, an RFID tag. For example, the user may carry an object which contains his unique ID code that may be read by the nearby user system. In any case, the user system can recognize the current user and display a welcome message for that user, as shown in FIG. 13.

Figure 14:
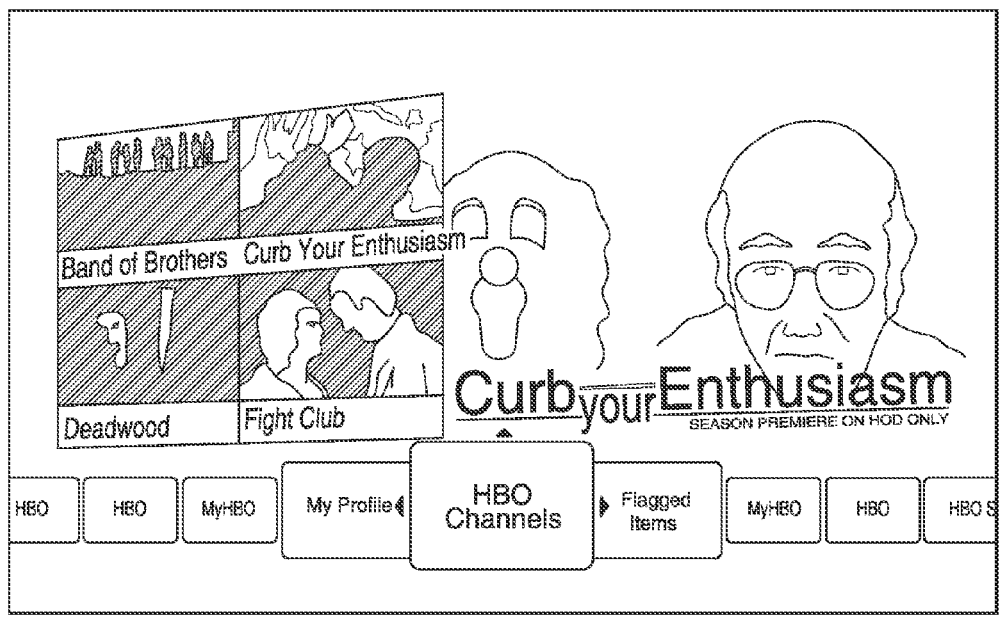
FIG. 14 shows a user interface screen for a rich media site.

FIG. 14 shows a user interface screen displayed by a user interface for a rich media site, similar to those being introduced by some cable system operators. This UI appears like a "filmstrip." A video sample may be played upon selecting an item in the filmstrip. Navigating the UI can be performed using only a 4-way direction-select pad, a numerical pad, an "Options" button and a "Menu" button on a handheld remote controller. The user interface screen may be for a pre-packaged on demand channel that offers some personalization. Such an on demand channel may be organized as a playlist, packaged, and marketed to appeal to passive viewing habits. The channel may offer personalization. For example, users may be able to rename the channel and/or include extra content provided with that channel. In another embodiment, the content of the channel may be dynamically modified by the content provider. In yet another embodiment, a channel may acquire "faux-linear" qualities.

For example, a particular program within the channel may only play on or after a specific date and time.

Figure 15:
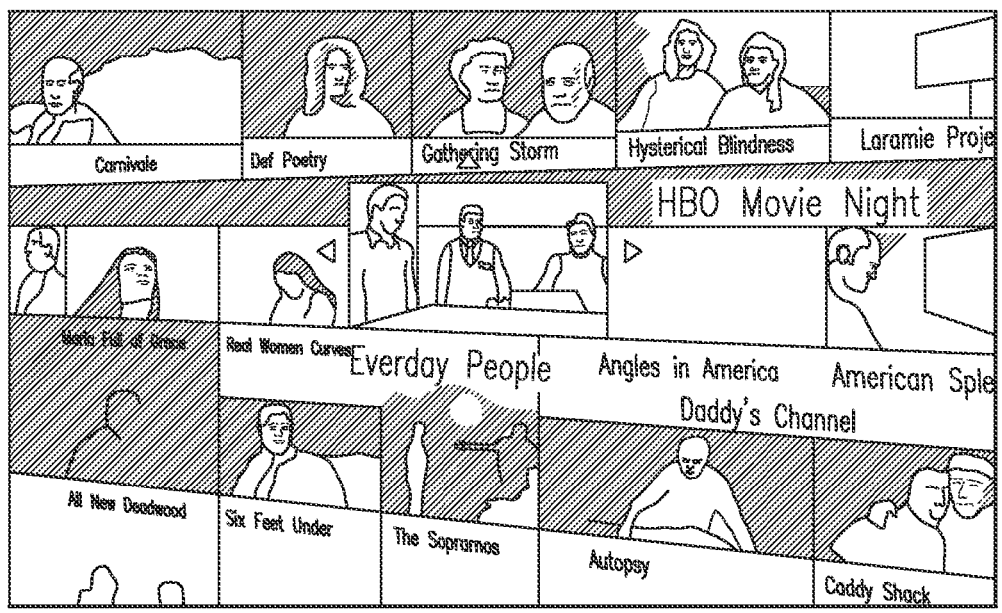
FIG. 15 shows a user interface screen for selecting channels that may be provider-generated, user-generated, third-party generated, or any combination of these three.

FIG. 15 shows a user interface screen for selecting channels. The screen may be provider-generated, user-generated, third-party generated, or any combination of these three. The UI may be configured such that, for example, user selection of up/down buttons on an associated remote control device selects different channels, while left/right buttons select different shows within a channel, e.g., that are shown at different times. This UI presentation may aid the user in determining which content is available for viewing and when.

Figure 16:
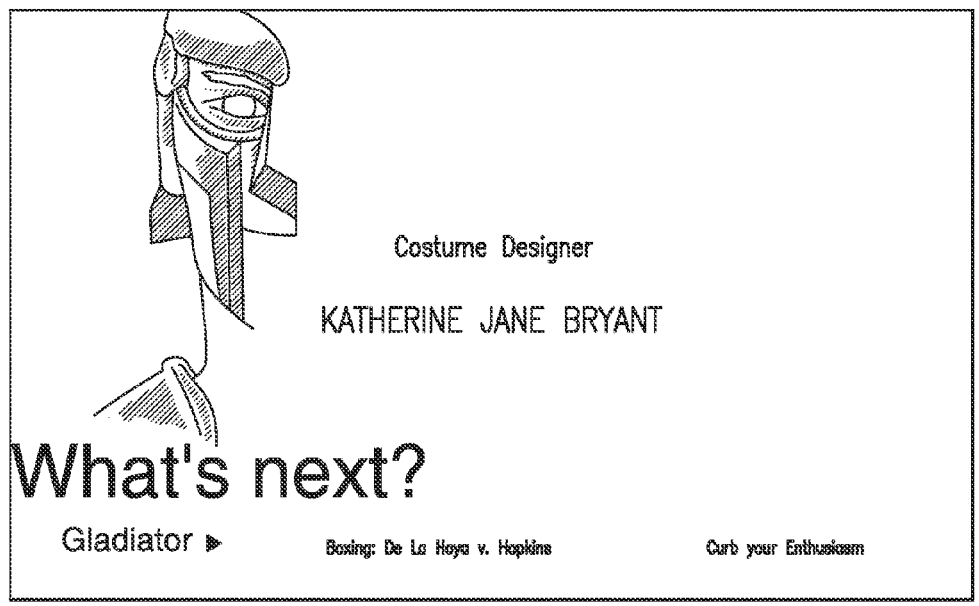
FIG. 16 shows a user interface screen that may be presented at the end of a program.

FIG. 16 shows a user interface screen providing "What's next" data/content that may be presented at the end of a program. As the program comes to an end, a number of options for what to watch next may be presented. These options may be the next several items in a channel/playlist. Options may also be dynamically targeted to specific users, for example, during the ending credits of specific shows. In one embodiment, locally inserted "What's next" data/content may be locally overlaid on a program feed. Users can navigate and select these "What's next" options using, for example, a handheld remote control.

The options for what to watch next shown at the bottom of FIG. 16 may comprise the output of the Table of Contents Manager 840 of FIG. 8.

In an example embodiment of the present invention, if a user does not do anything after display of the "What's next" data/content, the next show of the channel to which the viewing station is tuned may automatically start playing. Alternatively, the next show of the "What's next" data/content may automatically start playing.

The system may be configured to ask the user at the end of each show to rate the content. The ratings thus obtained may be used to make better recommendations for future viewing. The system may also be configured to ask the user at the end of each show if the user would like to view something else like that show. The system may search for similar shows to recommend based upon metadata supplied by content providers and/or other users and/or experts like critics or celebrities.

In one embodiment of the invention, the lists created by the three (or more) search engines may be displayed, e.g., as previews, as an insert or overlay on movie credits or other low value material. For an overlay on credits or other time limited material, the system and method may output the lists in a manner determined based on information indicating the duration of the time limited material. For example, if the time limited material's duration is short, the system and method may generate a list having fewer selections than had there been more time for output of the list. Similarly, type font used and whether a video clip is provided may be based on the time limited material's indicated duration.

Intermission

Conventionally, when playback of programs that can be paused, such as on-demand programs, programs played back from a PVR, or computer downloaded programs, are paused by a user, a last displayed screenshot remains statically displayed until playback is resumed.

In an example embodiment of the present invention, when playback of a program is paused, the system and method of the present invention may display an intermission screen providing useful information to the user.

In one embodiment of the invention, the lists created by the three (or more) search engines may be displayed during pauses of currently displayed content, for example, when the user pauses a video, (e.g., as an intermission screen) or as an insert or overlay on the last displayed screenshot.

Figure 17:
FIG. 17 shows a user interface screen that may be presented during intermissions within or between programs.

The "What's next" data/content and other user profile dependent data may be one of a plurality of features the system may provide during pauses. For example, in one example embodiment, similar to the "What's next" data/content, the system may provide personalized promotions or advertisements inserted somewhere on screen at pauses. For example, FIG. 17 shows a user interface screen that may be presented during intermissions within or between programs. FIG. 17 shows an advertisement for "The Sopranos" presented while the program "Deadwood" is paused. The personalization of the promotions or advertisements may be based on the user profile, the user's observed behavior, and/or the user's geographic location.

In another example embodiment, the system may provide easy access to such features as voicemail, e-mail, or text messages during pauses. For example, the system may present summary information (such as From, Subject, etc.) about previously received e-mail or voicemail on the display screen during pauses.

In another example embodiment, the system may provide in the intermission screen information regarding the paused program. For example, information about the cast, producers, directors, etc., and, in particular, those indicated to be favorites of the user, may be displayed. In another example, a synopsis of the paused program, or of the portion of the paused program up to the point at which the program is paused may be provided. For example, different synopses or portions of a single synopsis may be associated with different points within the program, so that depending on the point at which the program is paused, a particular one of the synopses or of the portions of the synopsis is displayed. This may be useful, for example, to help one who had not been present during playback of all of the played back portion of the program joins in the viewing to get caught up in what had occurred in the already played back portion of the program.

In other example embodiments, the intermission screen may include starting points along a navigable path for purchasing of products associated with the paused program; community "buzz" regarding the paused program, playback navigation options, such as fast forward, rewind, menu, etc.; graphical input objects for receiving user input, such as ratings, regarding the paused program, or other network feedback input; geographically targeted news, sports, weather, or traffic feeds; other scheduling information, such as a linear channel playlist; and/or Really Simple Syndication (RSS) subscription data feeds.

Figure 18:
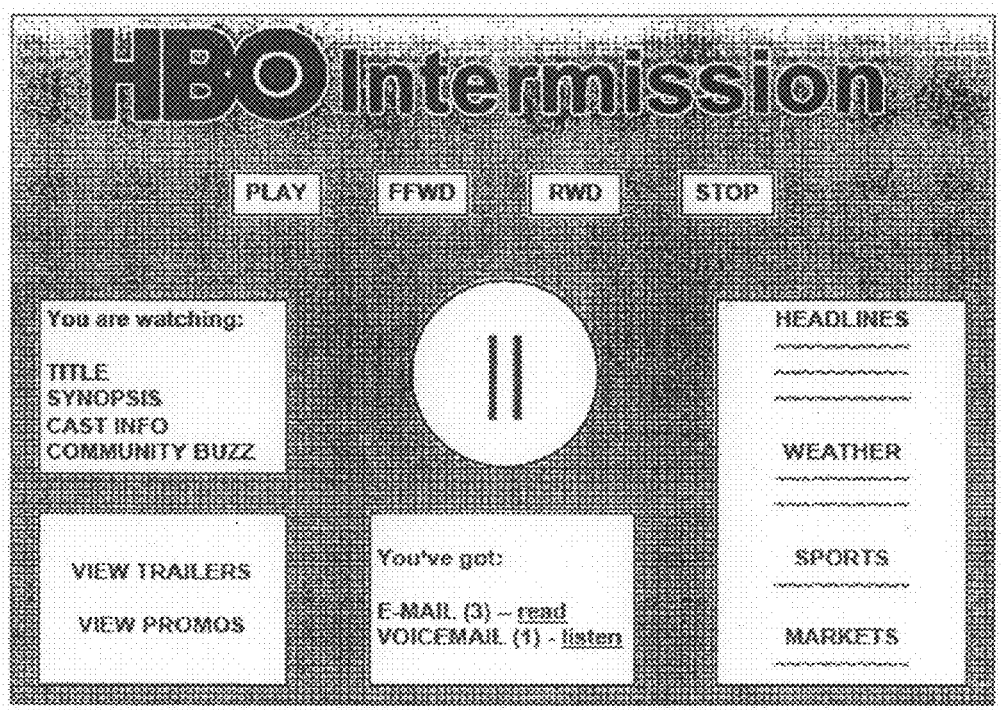
FIG. 18 shows a user interface screen including a plurality of icons for different intermission data, according to an example embodiment of the present invention.

In one example embodiment, different ones of the above enumerated intermission screen data may be provided in a single intermission screen. For example, the intermission screen may include a plurality of icons associated with the different types of data as shown in FIG. 18, or the intermission screen may include a plurality of frames for the different types of data, e.g., where each frame includes scrolling data.

In one example embodiment, the user may set a home web page that may be displayed as an intermission screen whenever a program is paused.

In one embodiment, all viewing stations or households may receive the same intermission content. In another embodiment, customized intermission content may be presented to each user.

The user may be able to configure whether certain information, for example, promotions, should be displayed during pauses.

In an example embodiment of the present invention, the system may be configured by an operator or user to go to a certain channel during pauses. For example, a "music on hold" feature could be created by configuring the system to always go to MTV when the user pauses the current content.

Enhanced Playlists

The system and method may assist the user in dynamically creating personalized "playlists," a list of user selected programs to be played to the user. For example, in addition to providing a facility for the user to choose a program other than one that is currently playing by either skipping ahead in a playlist or randomly selecting a program not on the playlist (and perhaps also subsequently returning to a playlist after a random program selection), the system may also make suggestions that solicit user input in enhancing the playlist. For example, if the next program scheduled to be played is Alien 3, the system may query the user to determine if the user would like to view Alien 2 before proceeding to view Alien 3. This is just one of many possible examples where the system may suggest related content that may contribute to an enhanced "nonlinear" playlist.

Virtual Linear Channel

In an example embodiment of the present invention, with respect to on-demand available programming, such as programming provided by a content provider on demand, content downloadable from a computer network server, or locally stored content, instead of, or in addition to, using the three (or more) engines to provide "What's next" data in the form of a personalized list or schedule of content, the three (or more) engines may be used to generate a playback lineup of content. For example, the output of the engines may create a virtual linear channel of content including content of various media sources that is played back linearly when the channel is active, i.e., when the user "tunes" to the channel. Linear playback means that it plays in a present sequence, rather than requiring the user to individually select a particular desired program. For example, if the user selects the virtual channel, the system may play a first of the virtual channel's content not already viewed by the user from within the virtual channel. Alternatively, even if viewed in another channel, the system may mark it as having been viewed. In one example embodiment, it may be marked as having been viewed for a certain predetermined amount of time or for as long as it is one of a last 'x' number of viewed programs.

In an example embodiment of the present invention, if the user exits from the virtual channel during playback of a program of the virtual channel, and then returns, the system may continue playback of the unfinished program from the point at which the user exited the virtual channel.

The content lineup of the virtual channel may change over time, in accordance with a change in the available on-demand programs or a change in the preferences of one or more of the search engines. In one example embodiment, once playback of a program has begun, it may be continued until completion even if a change in preferences dictates the program's removal from the virtual channel content lineup. In one example embodiment, the system may receive user input instructing that a program should be skipped. According to this embodiment, if the instruction is received, the program to be skipped may be removed from the virtual channel content lineup or may be placed at a different slot in the order of the content lineup.

In one example embodiment of the present invention, the content of the virtual channel may be stored, either in response to received user input or even without an explicit instruction, on a removable storage medium, so that the user can play the virtual channel on the go using various terminals, such as a laptop computer. The amount of content stored on the removable medium may depend on the particular storage medium used. It may be required for the various terminals to have installed thereon an interface for playing the stored content.

In one example embodiment, the system may provide a plurality of "What's Next" data lists and/or virtual channels, each corresponding to a different category of content. The categories may be predefined or input by the user. For example, categories may be comedy, drama, action, etc.

In one example embodiment, the system may provide for flagging of content by a user, where the flagged content are, for example, stored locally, and are aggregated into another virtual channel. For example, if a user comes across a program of particular interest, the user might flag the program for later viewing.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented data generation method, comprising:
   storing at least one content preference of a first user;
   storing at least one non-user content preference, which is at least one content preference of at least one entity other than the first user;
   associating the at least one non-user content preference with the first user; and
   generating, by a computer processor, a content list based on a combination of the stored at least one content preference of the user and the stored at least one non-user content preference for output to the first user;
   for display of the content list, overlaying the content list on ending credits of a program.

2. A computer-implemented data generation method, comprising:
   storing at least one content preference of a first user;
   storing at least one non-user content preference, which is at least one content preference of at least one entity other than the first user;
   associating the at least one non-user content preference with the first user; and
   generating, by a computer processor, a content list based on a combination of the stored at least one content preference of the user and the stored at least one non-user content preference for output to the first user; and
   displaying the content list in an intermission screen provided when a program is paused.

3. A computer-implemented data generation method, comprising:
   storing at least one content preference of a first user;
   storing at least one non-user content preference, which is at least one content preference of at least one entity other than the first user;
   associating the at least one non-user content preference with the first user; and generating, by a computer processor, a content list based on a combination of the stored at least one content preference of the user and the stored at least one non-user content preference for output to the first user;

for content listed in the content list that is available for playback on demand, generating a virtual linear playback channel including the content, wherein the virtual linear playback channel linearly plays back the content when the channel is active.

* * * * *